US012272339B1

(12) United States Patent
Kuzma

(10) Patent No.: US 12,272,339 B1
(45) Date of Patent: Apr. 8, 2025

(54) AUTOMATED STRING PLAYING SYSTEM FOR A STRINGED INSTRUMENT

(71) Applicant: Michael Stanley Kuzma, Avon, IN (US)

(72) Inventor: Michael Stanley Kuzma, Avon, IN (US)

( * ) Notice: Subject to any disclaimer, the term of this patent is extended or adjusted under 35 U.S.C. 154(b) by 248 days.

(21) Appl. No.: 18/121,219

(22) Filed: Mar. 14, 2023

(51) Int. Cl.
*G10F 1/20* (2006.01)
*G10D 3/00* (2020.01)

(52) U.S. Cl.
CPC *G10F 1/20* (2013.01); *G10D 3/00* (2013.01)

(58) Field of Classification Search
CPC .................................... G10F 1/20; G10D 3/00
See application file for complete search history.

(56) References Cited

U.S. PATENT DOCUMENTS 705,952 A * 7/1902 McTammany ............ G10F 1/20 84/8
702,898 A * 9/1902 Stiles, Jr. .................. G10F 1/20 84/50
1,018,384 A * 2/1912 Wauters .................... G10F 1/18 84/146
1,238,884 A * 9/1917 Cartmell ................... G10F 1/20 84/273
1,797,609 A * 3/1931 Hallbauer ................. G10F 1/20 984/211
1,871,021 A * 8/1932 Zachrison ................. G10F 1/20 984/211
3,469,489 A * 9/1969 Barth ....................... G10D 1/08 984/115
4,615,253 A * 10/1986 McGovern ............... G10D 3/08 984/116
5,212,330 A * 5/1993 Cooper .................. G10D 3/173 84/320
5,393,925 A * 2/1995 Wilson ...................... G10F 1/20 84/321
6,166,307 A * 12/2000 Caulkins .................. G10D 3/00 84/50
6,723,904 B1 * 4/2004 Dolan ...................... G10D 3/00 84/290
7,285,709 B2 * 10/2007 White ...................... G10D 3/08 84/320
7,285,716 B2 * 10/2007 Gilmore .................... G10F 1/20 84/727
8,492,627 B2 * 7/2013 DuPra .................... G10D 3/173 84/723

(Continued)

*Primary Examiner* — Robert W Horn
(74) *Attorney, Agent, or Firm* — Reising Ethington PC

(57) ABSTRACT

An automated string playing system for a stringed instrument is provided. The instrument has a body, a neck having a fretboard, and a string. The system includes a fretting subsystem having first and second frame members, a drive belt, a drive belt motor, a drive belt pulley, a longitudinal guide rail, and a fretting assembly. The fretting assembly has a carriage member and a cam assembly. The carriage member is slidably coupled to the longitudinal guide rail and the drive belt. The drive belt motor moves the drive belt and the cam assembly to desired positions along the fretboard. The cam assembly has a cam that rotates such that a pad contacts the string to fret the string. The system includes a picking subsystem having a picking solenoid that moves a pick across the string of the stringed instrument to obtain a musical sound.

11 Claims, 33 Drawing Sheets

(56) References Cited

U.S. PATENT DOCUMENTS

| | | | | |
|---|---|---|---|---|
| 8,546,672 | B1 * | 10/2013 | Pinzone | G10D 3/16 84/320 |
| 10,891,927 | B1 * | 1/2021 | Finger | G10D 3/173 |
| 11,404,035 | B1 * | 8/2022 | Kuzma | G10F 1/20 |

* cited by examiner

AUTOMATED STRING PLAYING SYSTEM FOR A STRINGED INSTRUMENT

BACKGROUND

The automated string playing system is an augmentation to any stringed instrument with a neck and fretboard/fingerboard that plays the stringed instrument. Unlike a player piano that utilizes a dedicated hammer for each note, the automated string playing system utilizes a fretting system and a picking system in combination with the fretboard/fingerboard of the stringed instrument to play multiphonic musical passages. Also, unlike the player piano, the automated string playing system can be removed from the stringed instrument entirely. The automated string playing system can be utilized with any stringed instruments having a fretboard/fingerboard (e.g., a guitar, a banjo, a bass, a violin, a viola, a cello, a ukulele, a mandolin, a guitar).

SUMMARY

An automated string playing system for a stringed instrument in accordance with an exemplary embodiment is provided. The stringed instrument has a body, a neck extending from the body, and a string tensioned between the body and a top portion of the neck. The neck has a fretboard attached thereto. The automated string playing system includes a fretting subsystem that is removably coupled to the neck. The fretting subsystem has first and second frame members, a drive belt, a drive belt motor, a drive belt pulley, a longitudinal guide rail, and a first fretting assembly. The drive belt motor is coupled to the first frame member. The drive belt pulley is coupled to the second frame member. The drive belt is operably coupled to and between the drive belt motor and the drive belt pulley. The first longitudinal guide rail is coupled to and between the first and second frame members. The first fretting assembly has a carriage member and a cam assembly coupled thereto. The carriage member is slidably coupled to the longitudinal guide rail, and coupled to the drive belt. The drive belt motor moves the drive belt and the cam assembly to desired positions along the fretboard. The cam assembly has a cam and a pad coupled to the cam. The cam rotates in a first rotational direction such that the pad contacts the string to fret the string. The automated string playing system further includes a picking subsystem that is removably coupled to the body. The picking subsystem has a picking solenoid that moves a pick across the string of the stringed instrument to obtain a musical sound. The automated string playing system further includes a user interface device operably coupled to the fretting subsystem and the picking subsystem that enables user control of the fretting subsystem and the picking subsystem to play music.

DETAILED DESCRIPTION

Referring to FIGS. 1-7, a stringed instrument 20, a stand 30, and an automated string playing system 40 in accordance with an exemplary embodiment is illustrated. The stand 30 is provided to hold the stringed instrument 20 thereon. The automated string playing system 40 is provided to automatically play the stringed instrument 20 to produce audible music as will be explained in greater detail below.

Figure 5:
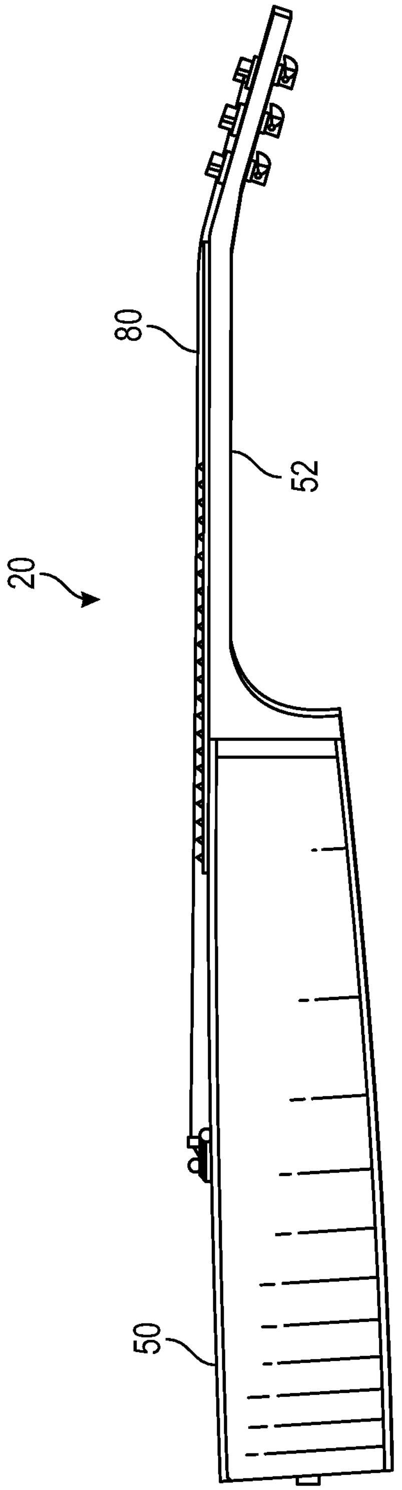
FIG. 5 is a side view of the stringed instrument of FIG. 1.
Figure 8:
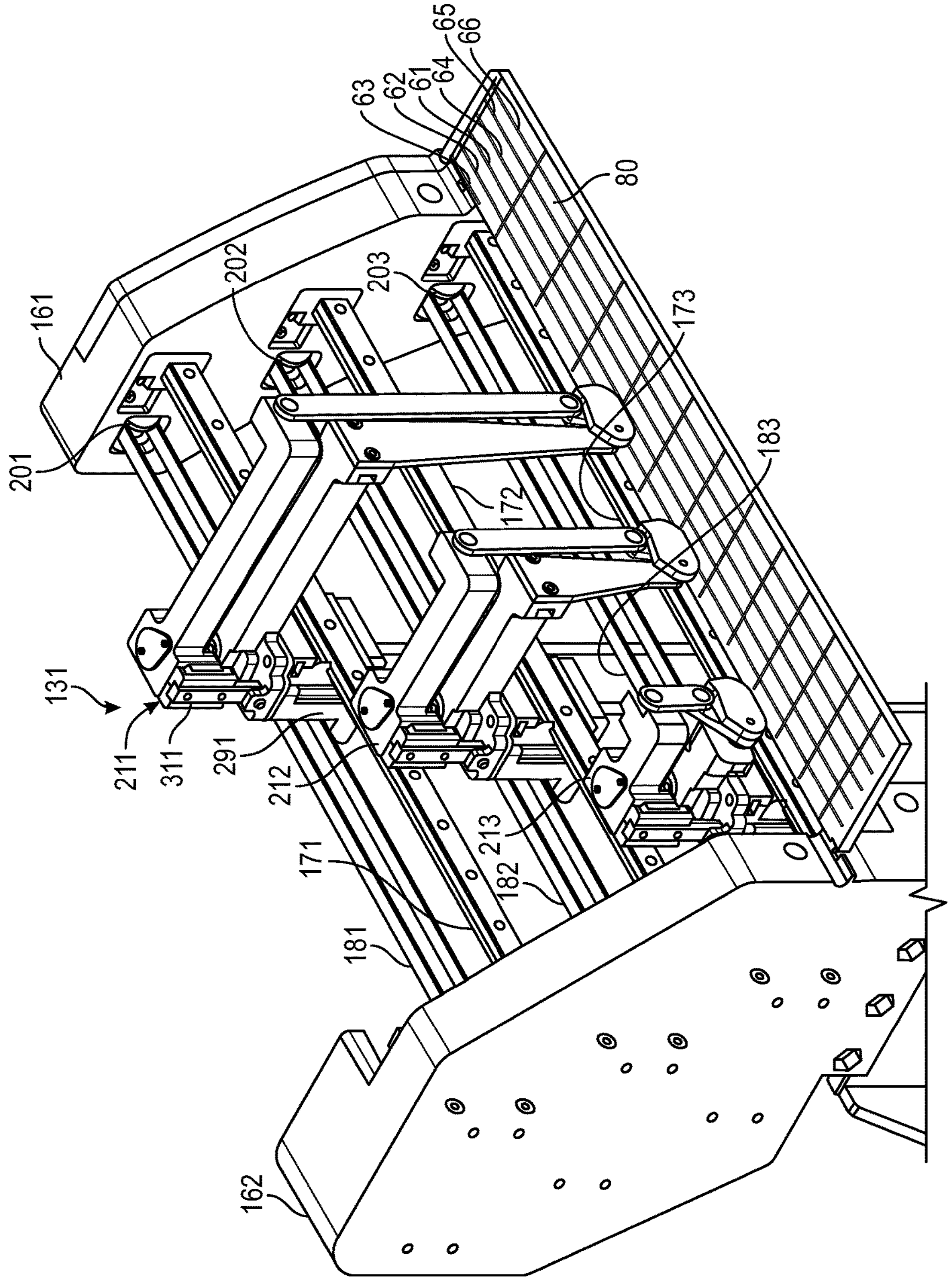
FIG. 8 is an isometric view of a portion of the first fretting subsystem utilized in the automated string playing system of FIG. 1.
Figure 9:
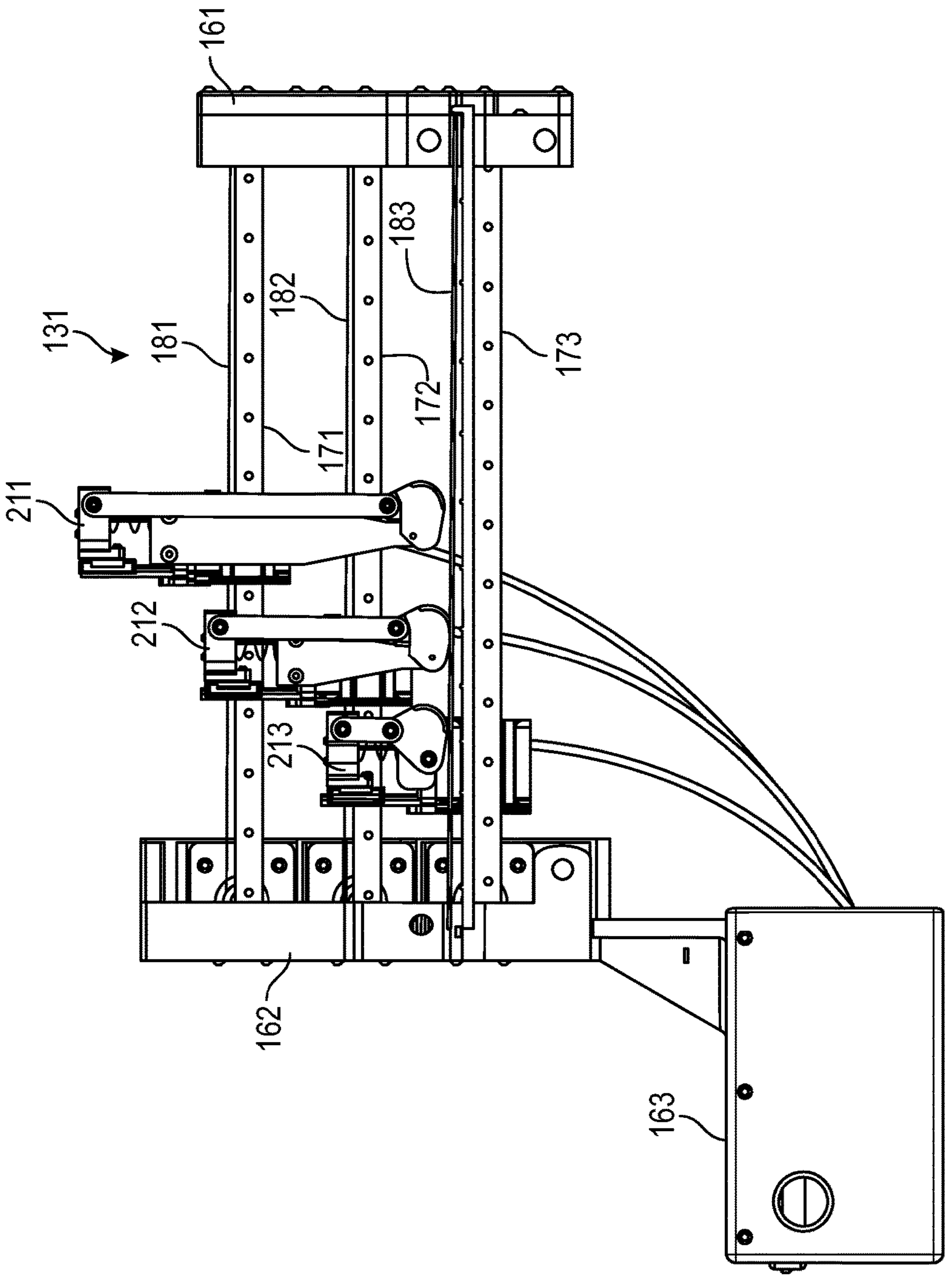
FIG. 9 is a side view of the first fretting subsystem of FIG. 1.
Figure 41:
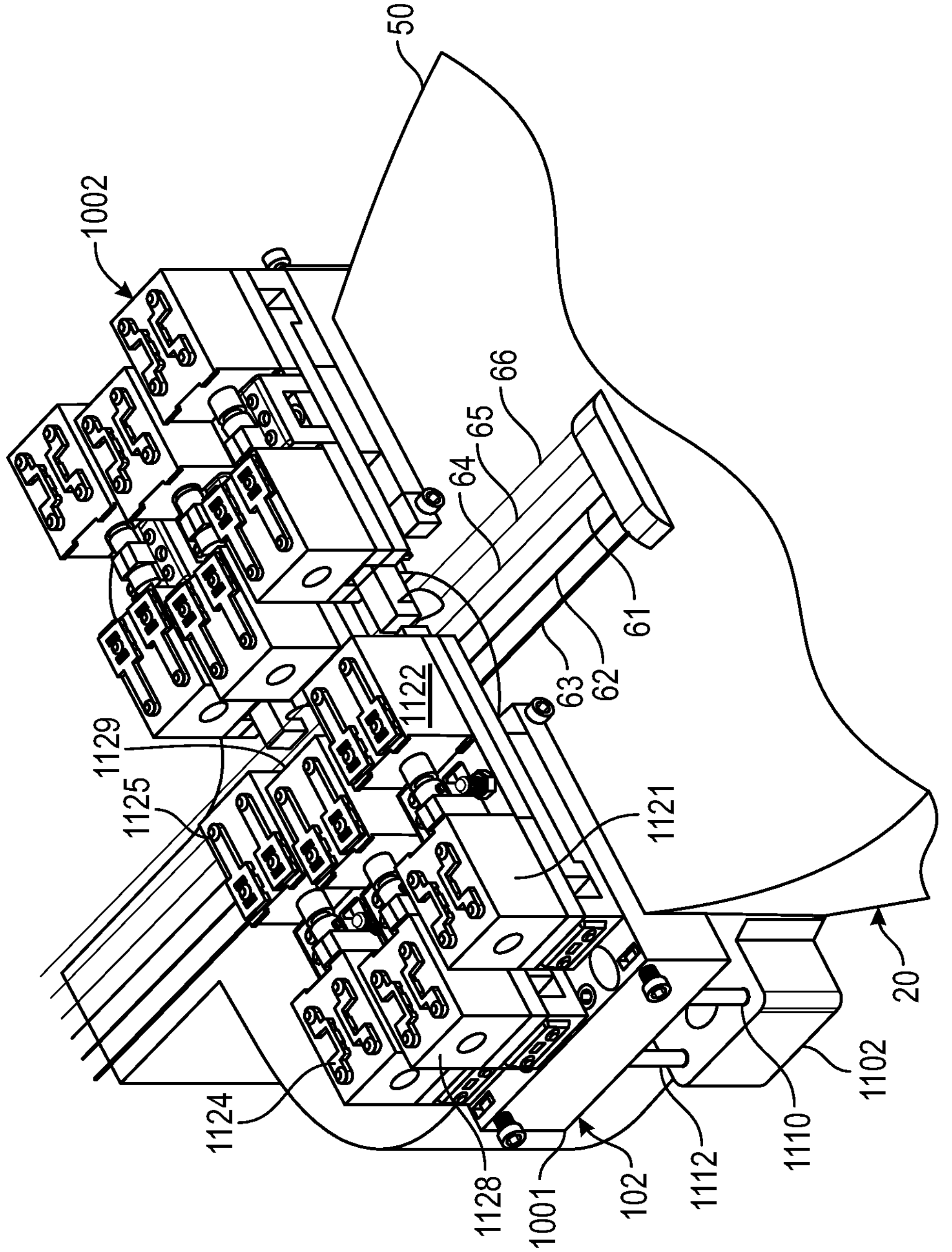
FIG. 41 is a schematic of a portion of a stringed instrument and a picking system utilized in the automated string playing system of FIG. 1.

Referring to FIGS. 5, 8 and 41, the stringed instrument 20 includes a body 50, a neck 52, strings 61, 62, 63, 64, 65, 66, and a fretboard 80. The neck 52 is coupled to and extends from the body 50. The strings 61, 62, 63, 64, 65, 66 extends from the body 50 to the neck 52. The neck 52 has a fretboard 80 attached thereto. It is noted that in an alternative embodiment the stringed instrument has less than six strings and the automated string playing system 40 can be adapted to play the stringed instrument. In another alternative embodiment, the stringed instrument has greater than six strings and the automated string playing system 40 can be adapted to play the stringed instrument.

Figure 4:
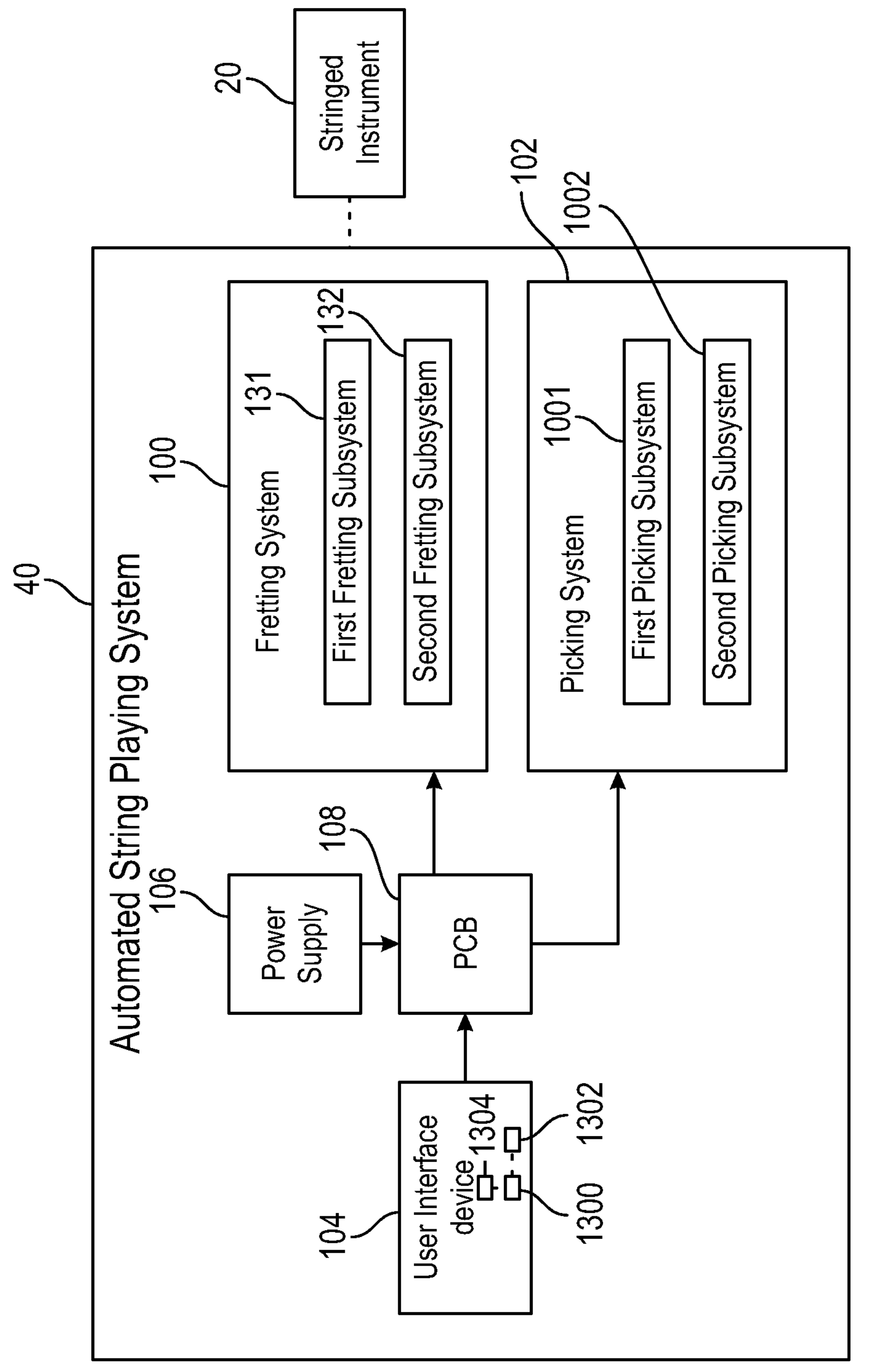
FIG. 4 is a block diagram of the automated string playing system of FIG. 1.

Referring to FIGS. 1-7, the automated string playing system 40 is provided to fret strings 61-66 and move picks across strings 61-66 of the stringed instrument 20 to play audible music. Referring to FIG. 4, the automated string playing system 40 includes a fretting system 100, a picking system 102, a user interface device 104, a power supply 106, and a printed circuit board (PCB) 108.

An advantage of the automated string playing system 40 is that the system 40 utilizes fretting assemblies each having a cam assembly to fret a respective string of the stringed instrument 40. Each cam assembly allows the system 40 to fret (press down) a respective string against the frets along the neck 52 of the stringed instrument 20. The fretting action executed by each cam assembly realistically simulates a human playing the stringed instrument 20. Due to its rotational movement, the cam assembly transfers pressing force in a gradual manner that drastically reduces fret wear and string wear while eliminating mechanical noise.

Fretting System

Figure 1:
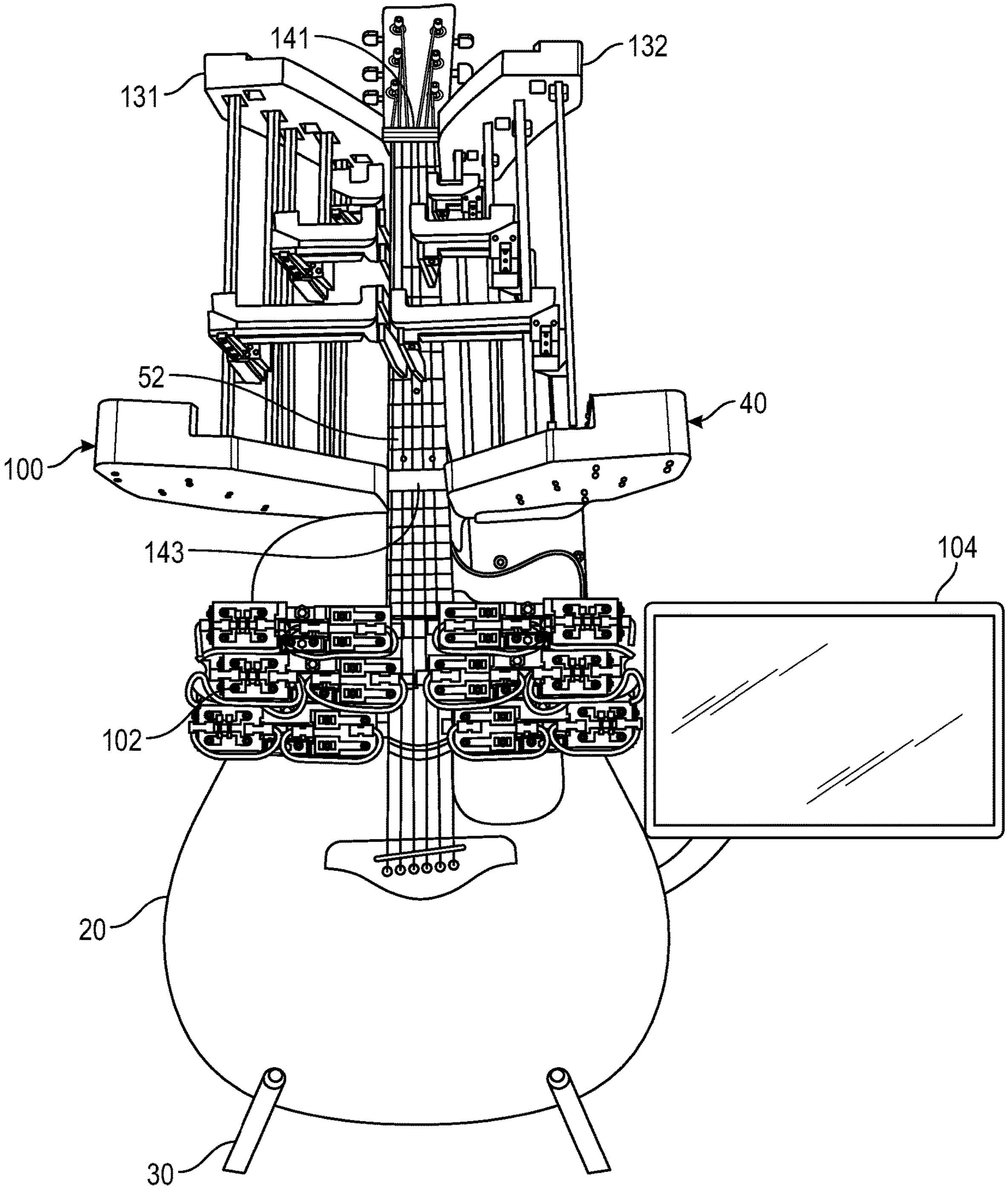
FIG. 1 is a front view of a stringed instrument, a stand, and an automated string playing system in accordance with an exemplary embodiment.
Figure 2:
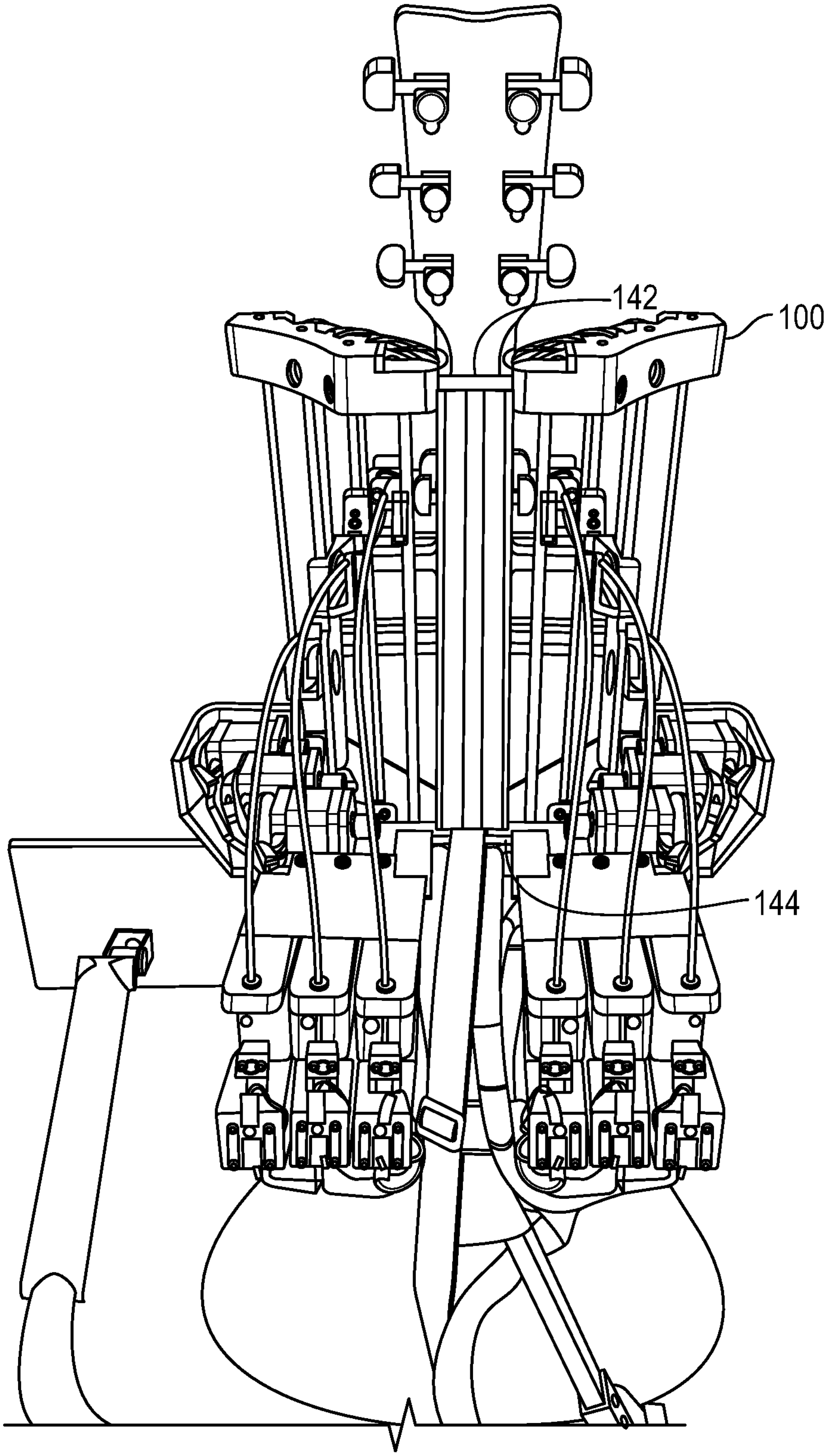
FIG. 2 is a rear view of the stringed instrument, the stand, and the automated string playing system of FIG. 1.
Figure 3:
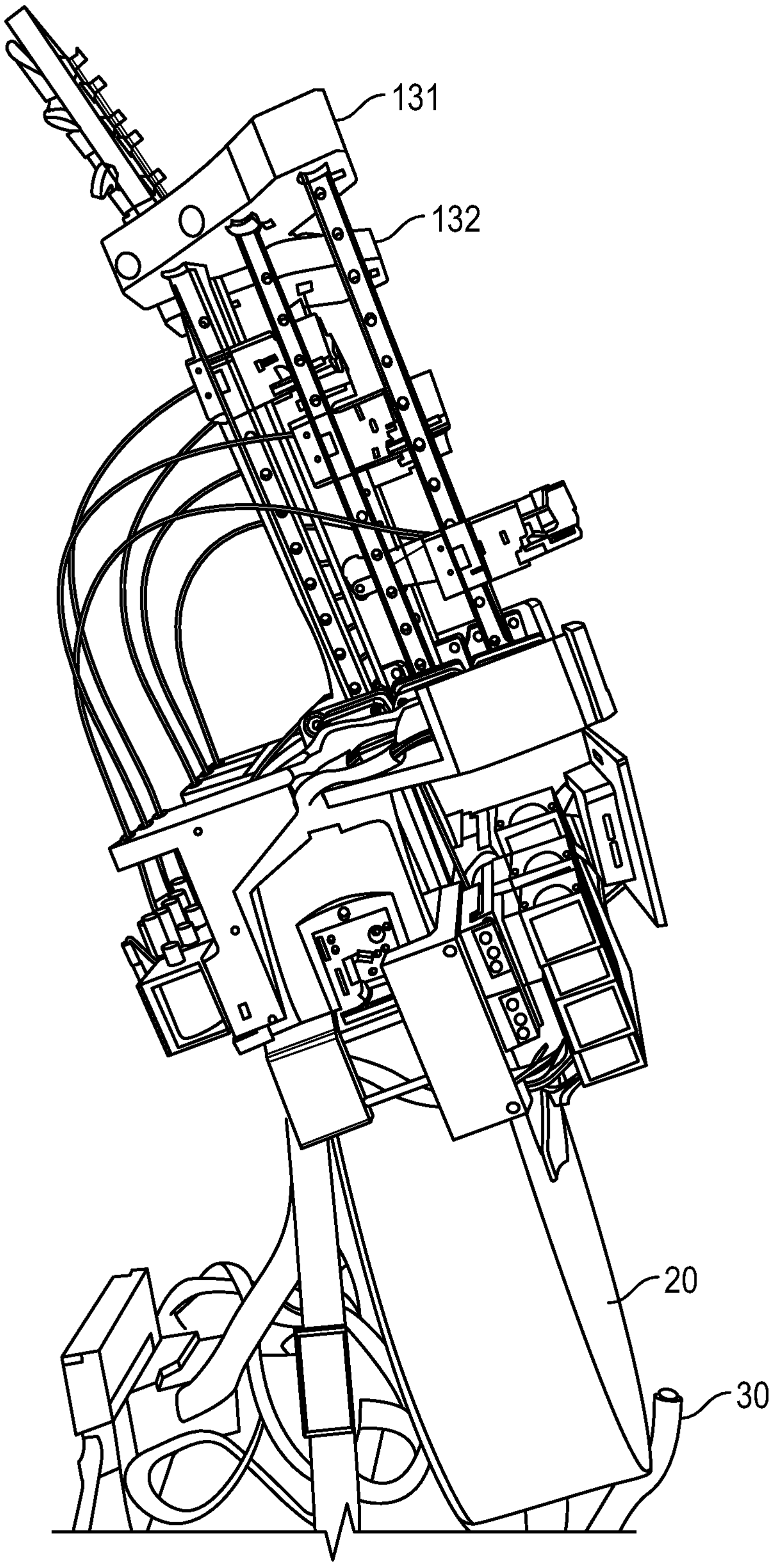
FIG. 3 is a side view of the stringed instrument, the stand, and the automated string playing system of FIG. 1.

Referring to FIGS. 1, 2, and 8, the fretting system 100 is provided to fret the strings 61-66 on the fretboard 80. The fretting system 100 includes a fretting subsystem 131, a fretting subsystem 132, and coupling rods 141, 142, 143, 144.

Fretting Subsystem

Referring to FIGS. 1 and 8-15, the fretting subsystem 131 is removably coupled to the neck 52 of the stringed instrument 20. The fretting subsystem 131 is provided to fret the strings 61-63. Referring to FIGS. 8-12, the fretting subsystem 131 includes a first frame member 161, a second frame member 162, a third frame member 163, a first longitudinal guide rail 171, a second longitudinal guide rail 172, a third longitudinal guide rail 173, a first drive belt 181, a second drive belt 182, a third drive belt 183, a first drive belt motor 191 (shown in FIGS. 10 and 11), a second drive belt motor 192, a third drive belt motor 193, a first drive belt pulley 201 (shown in FIGS. 8 and 12), a second drive belt pulley 202, a third drive belt pulley 203, a first fretting assembly 211, a second fretting assembly 212, and a third fretting assembly 213.

In an exemplary embodiment, there is a single fretting assembly on each longitudinal guide rail for fretting a respective string. In an alternative embodiment, there is a plurality of fretting assemblies on each longitudinal guide rail-which could increase the speed at which music is being played.

Figure 10:
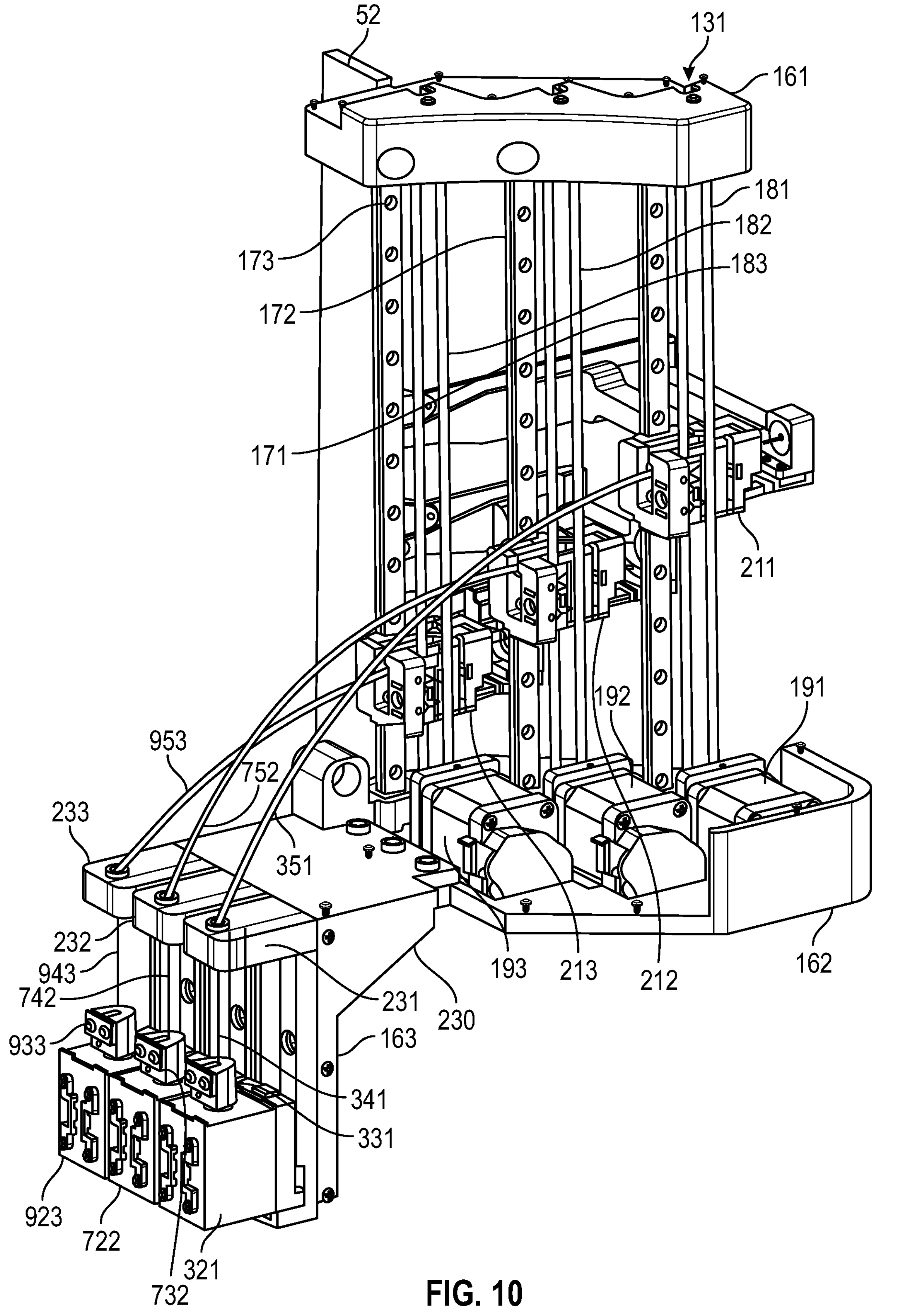
FIG. 10 is another isometric view of the first fretting subsystem of FIG. 1.

Referring to FIG. 10, the first, second, third frame members 161, 162, 163 are provided to support the remaining components of the fretting subsystem 131. The first and second frame members 161, 162 are spaced apart from one another and are removably coupled to the neck 52 of the stringed instrument 20. The third frame member 163 is coupled to the second frame member 162. The third frame member 163 includes a main bracket 230 and side brackets 231, 232, 233 which are attached to the main bracket 230. In an exemplary embodiment, the first, second, and third frame members 171, 172, 173 are constructed of plastic. In an alternative embodiment, the second frame member 172 is coupled to the picking system 102 instead of the neck 52. Also, a length of the first, second, and third longitudinal guide rails 171, 172, 173 would be increased to reach the picking system 102. In another alternative embodiment, the third frame member 173 is coupled to the picking system 102 instead of the second frame member 172. In yet another alternative embodiment, the third frame member 173 is coupled to the stand 30.

Referring to FIG. 8, the first, second, and third longitudinal guide rails 171, 172, 173 are coupled to and between the first and second frame members 161, 162. The first longitudinal guide rail 171 is parallel to the string 61. The second longitudinal guide rail 172 is parallel to the string 62. The third longitudinal guide rail 173 is parallel to the string 63. In an exemplary embodiment, the first, second, and third longitudinal guide rails 171, 172, 173 are constructed of metal.

Figure 12:
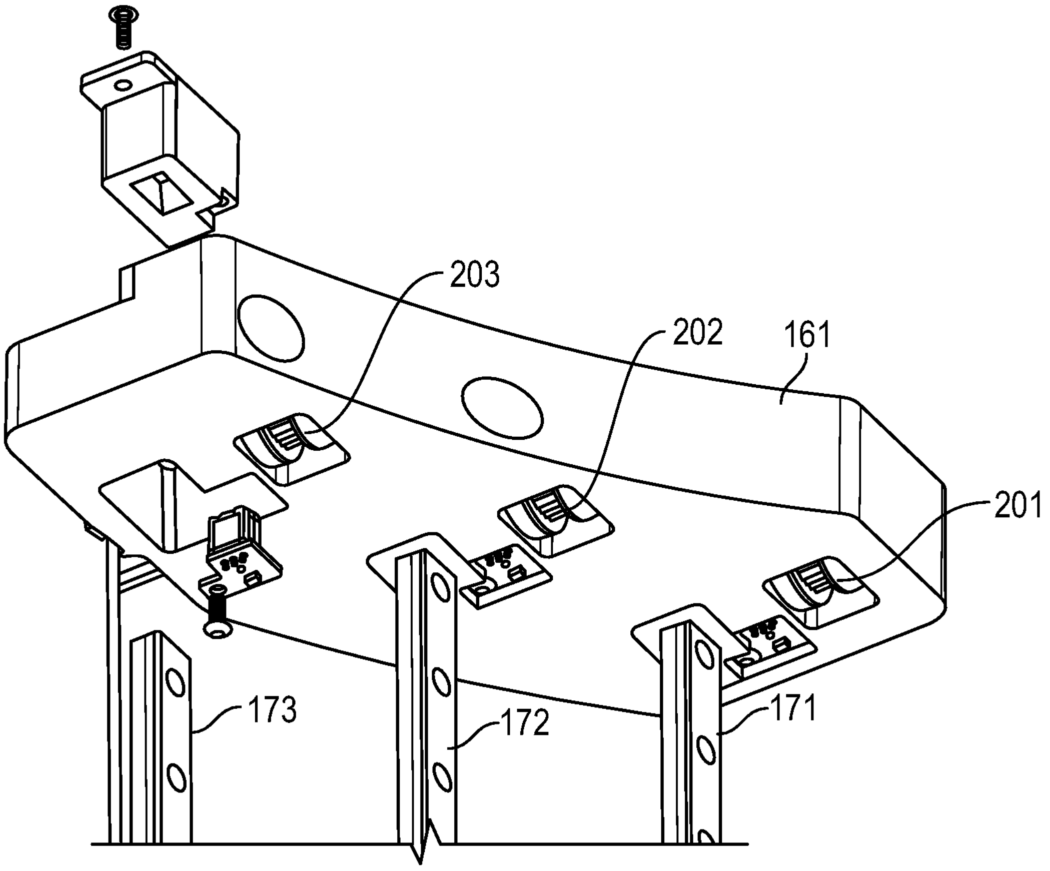
FIG. 12 is a partially exploded view of a portion of the first fretting subsystem of FIG. 10.
Figure 13:
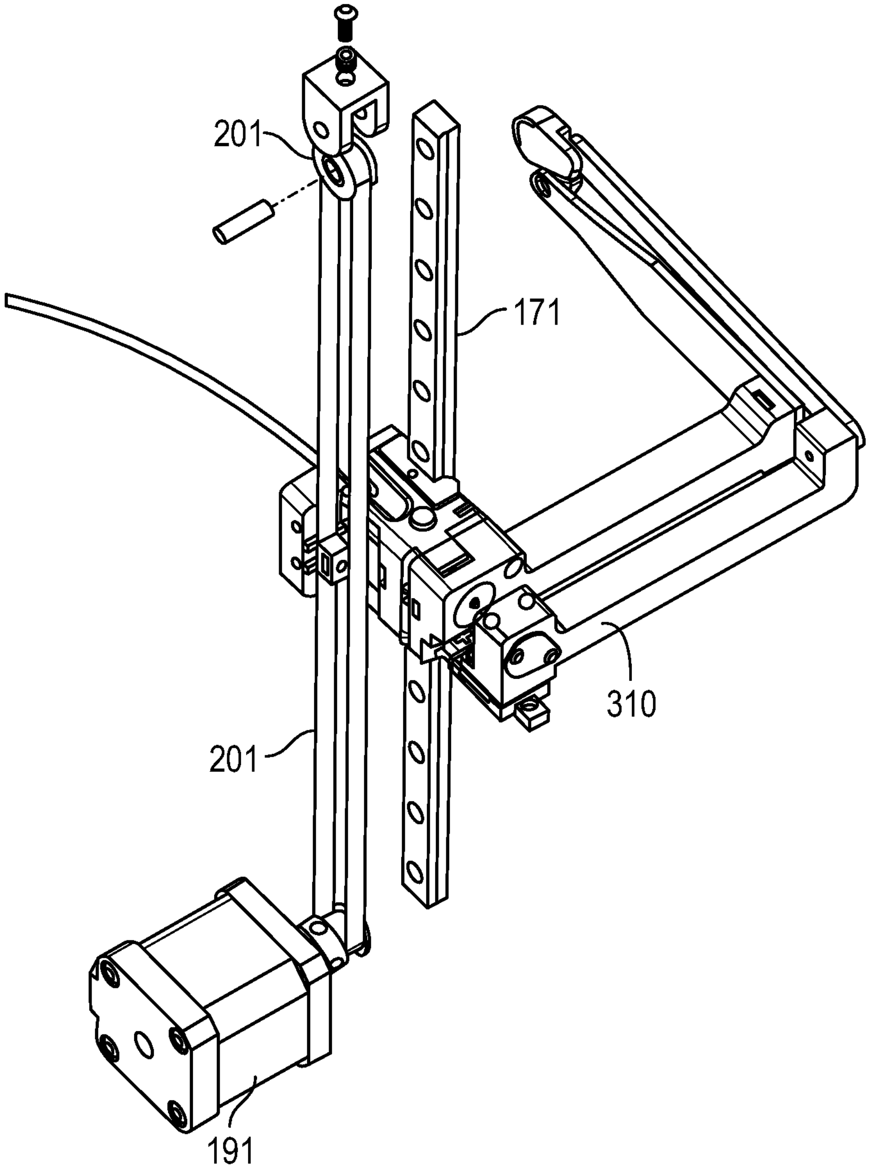
FIG. 13 is another partially exploded view of a portion of the first fretting subsystem of FIG. 10.

Referring to FIGS. 8 and 12, the first, second, third drive belt pulleys 201, 202, 203 are rotatably coupled to the first frame member 161 and are provided to rotatably support the first, second, third drive belts 181, 182, 183, respectively thereon.

Figure 11:
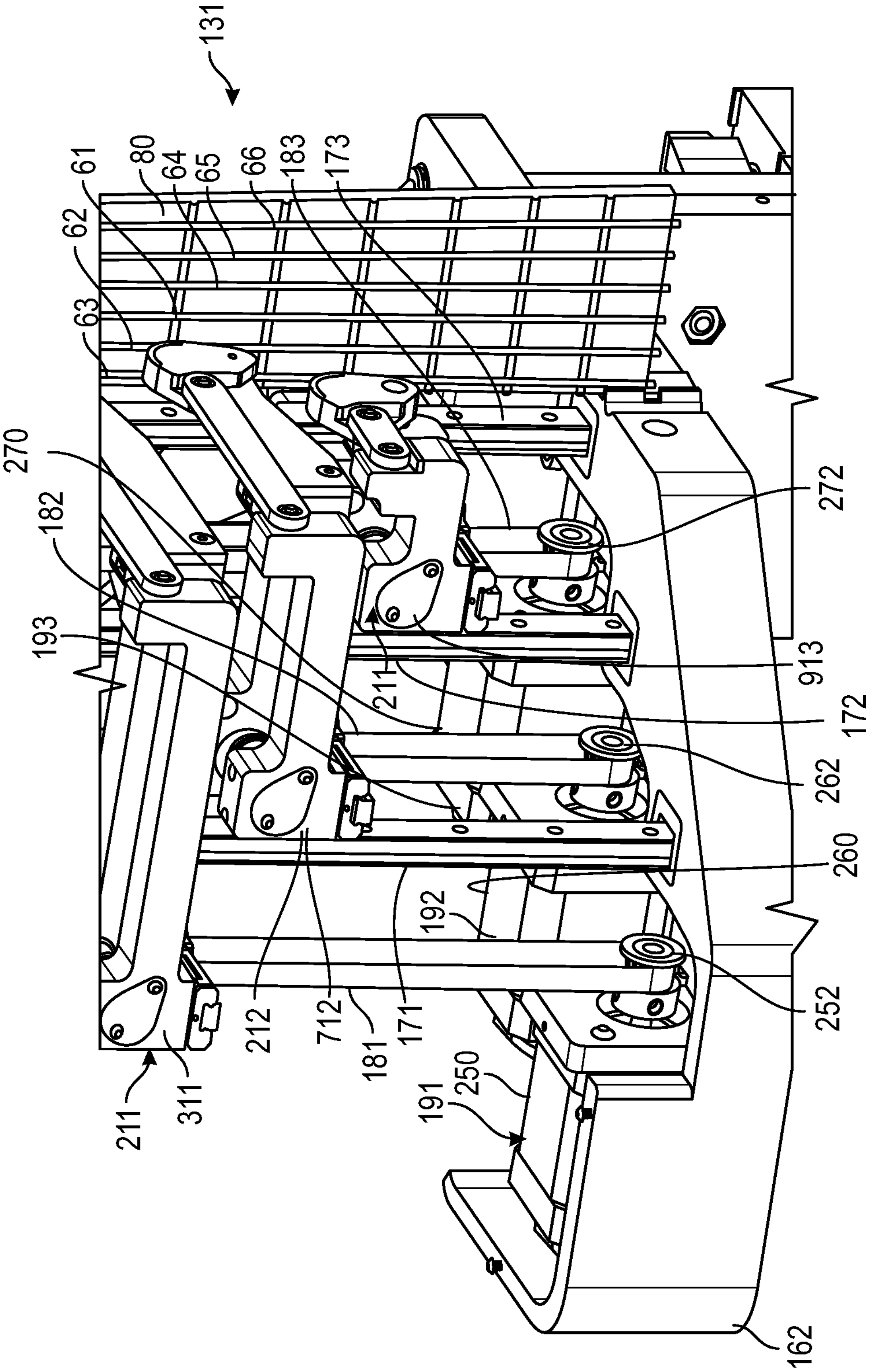
FIG. 11 is an enlarged view of a portion of the first fretting subsystem of FIG. 10.

Referring to FIGS. 10 and 11, the first, second, third drive belt motors 191, 192, 193 are provided to drive the first, second, third drive belts 181, 182, 183, respectively in either a first rotational direction or a second rotational direction. The first, second, third drive belt motors 191, 192, 193 are coupled to the second frame member 162.

Referring to FIGS. 4 and 11, the first drive belt motor 191 includes a motor body 250 and a rotor 252. The rotor 252 is rotatably coupled to the motor body 250. The rotor 252 rotates in a first rotational direction when the first drive belt motor 191 is energized by a control signal from the user interface device 104 via the PCB 108, and rotates in a second rotational direction when the first drive belt motor 191 is energized by another control signal from the user interface device 104 via the PCB 108. The first drive belt motor 191 moves the first drive belt 181 and the cam assembly 311 to desired positions along the fretboard 80.

The second drive belt motor 192 includes a motor body 260 and a rotor 262. The rotor 262 is rotatably coupled to the motor body 260. The rotor 262 rotates in a first rotational direction when the second drive belt motor 192 is energized by control signal from the user interface device 104 via the PCB 108, and rotates in a second rotational direction when the second drive belt motor 192 is energized by another control signal user from the interface device 104 via the PCB 108. The second drive belt motor 192 moves the second drive belt 182 and the cam assembly 712 to desired positions along the fretboard 80.

The third drive belt motor 193 includes a motor body 270 and a rotor 272. The rotor 272 is rotatably coupled to the motor body 270. The rotor 272 rotates in a first rotational direction when the third drive belt motor 193 is energized by control signal from the user interface device 104 via the PCB 108, and rotates in a second rotational direction when the third drive belt motor 193 is energized by another control signal from the user interface device 104 via the PCB 108. The third drive belt motor 193 moves the third drive belt 183 and the cam assembly 913 to desired positions along the fretboard 80.

Referring to FIGS. 11 and 12, the first drive belt 181 is operably coupled between the first drive belt pulley 201 and the rotor 252 of the first drive motor 191.

The second drive belt 182 is operably coupled between the second drive belt pulley 202 and the rotor 262 of the second drive motor 192.

The third drive belt 183 is operably coupled between the third drive belt pulley 203 and the rotor 272 of the third drive motor 193.

First Fretting Assembly

Referring to FIGS. 10-21, the first fretting assembly 211 is provided to fret the string 61. The first fretting assembly 211 includes a carriage member 291 (shown in FIG. 15), a cam assembly 311 (shown in FIG. 17), a fretting solenoid 321 (shown in FIG. 10), a piston bracket 331, a cable 341, a Bowden tube 351, a push-to-connect fitting 361 (shown in FIG. 14), a push-to-connect fitting 371 (shown in FIG. 19), a mounting bracket 381 (shown in FIG. 14), a cable tie 391 (shown in FIG. 14), and a cable tie 401 (shown in FIG. 19).

Referring to FIG. 8, the carriage member 291 is provided to hold the cam assembly 311 thereon. The carriage member 291 is slidably coupled to the first longitudinal guide rail 171, and coupled to the first drive belt 181. During operation, when the first drive belt 181 moves in a first direction, the carriage member 291 moves in the first direction. Alternately, when the first drive belt moves in a second direction, the carriage member 291 moves in the second direction. In an exemplary embodiment, the carriage member 291 is constructed of plastic and is mounted to a metal linear guide block.

Figure 19:
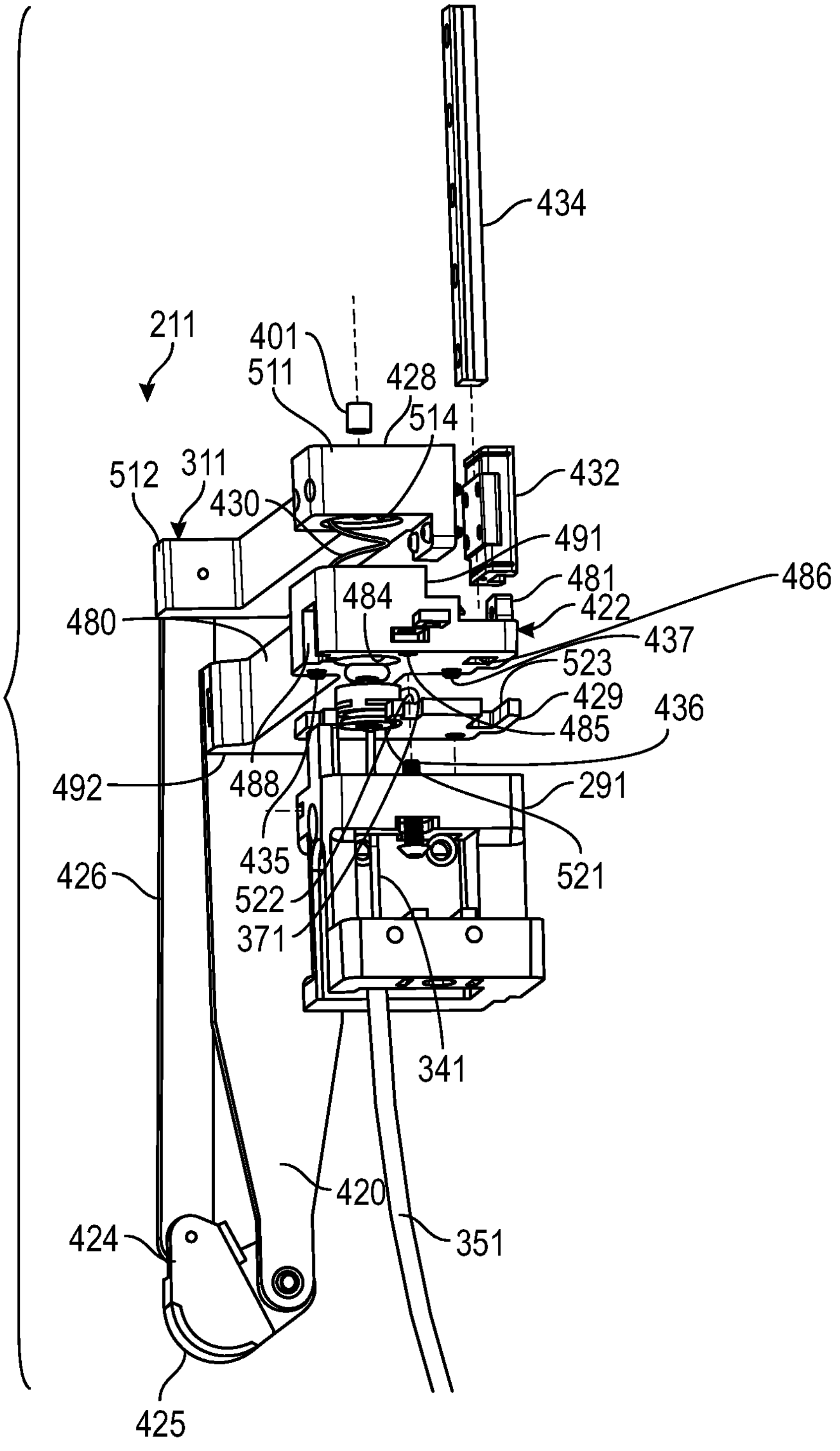
FIG. 19 is a partially exploded view of the carriage member and the cam assembly of FIG. 16.
Figure 20:
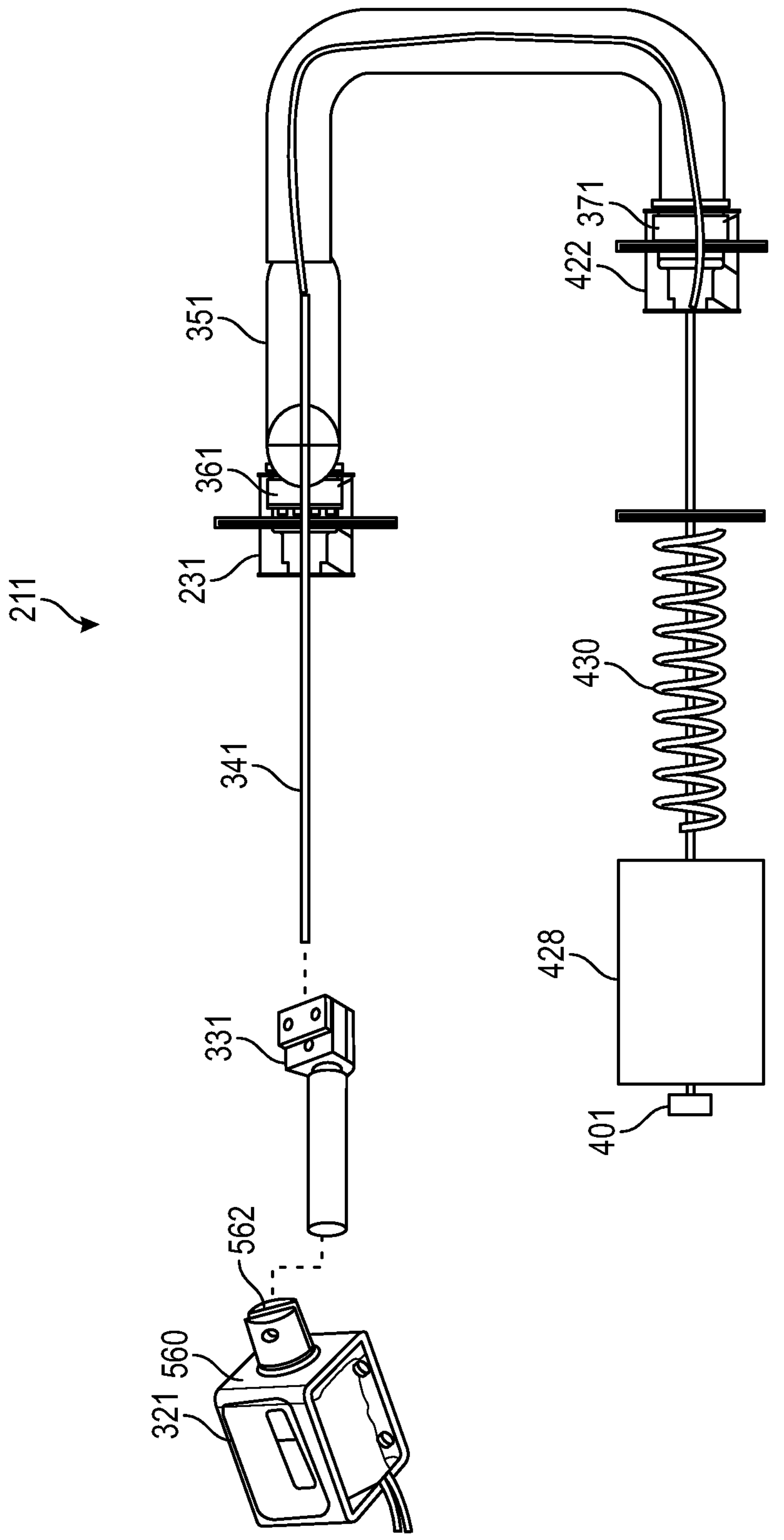
FIG. 20 is a simplified schematic of a portion of the first fretting subassembly of FIG. 10.
Figure 21:
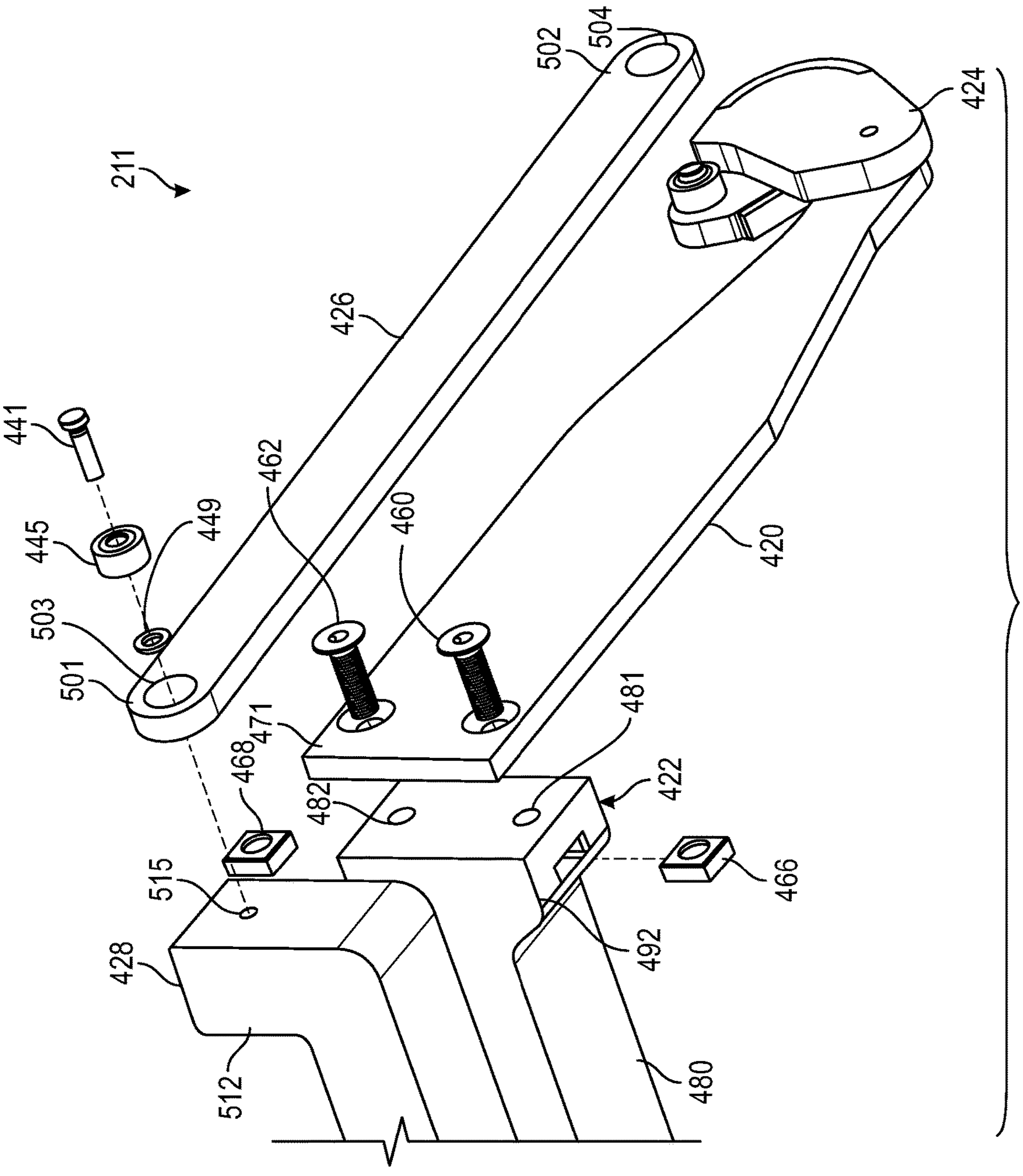
FIG. 21 is a partially exploded view of a portion of the cam assembly of FIG. 16.
Figure 22:
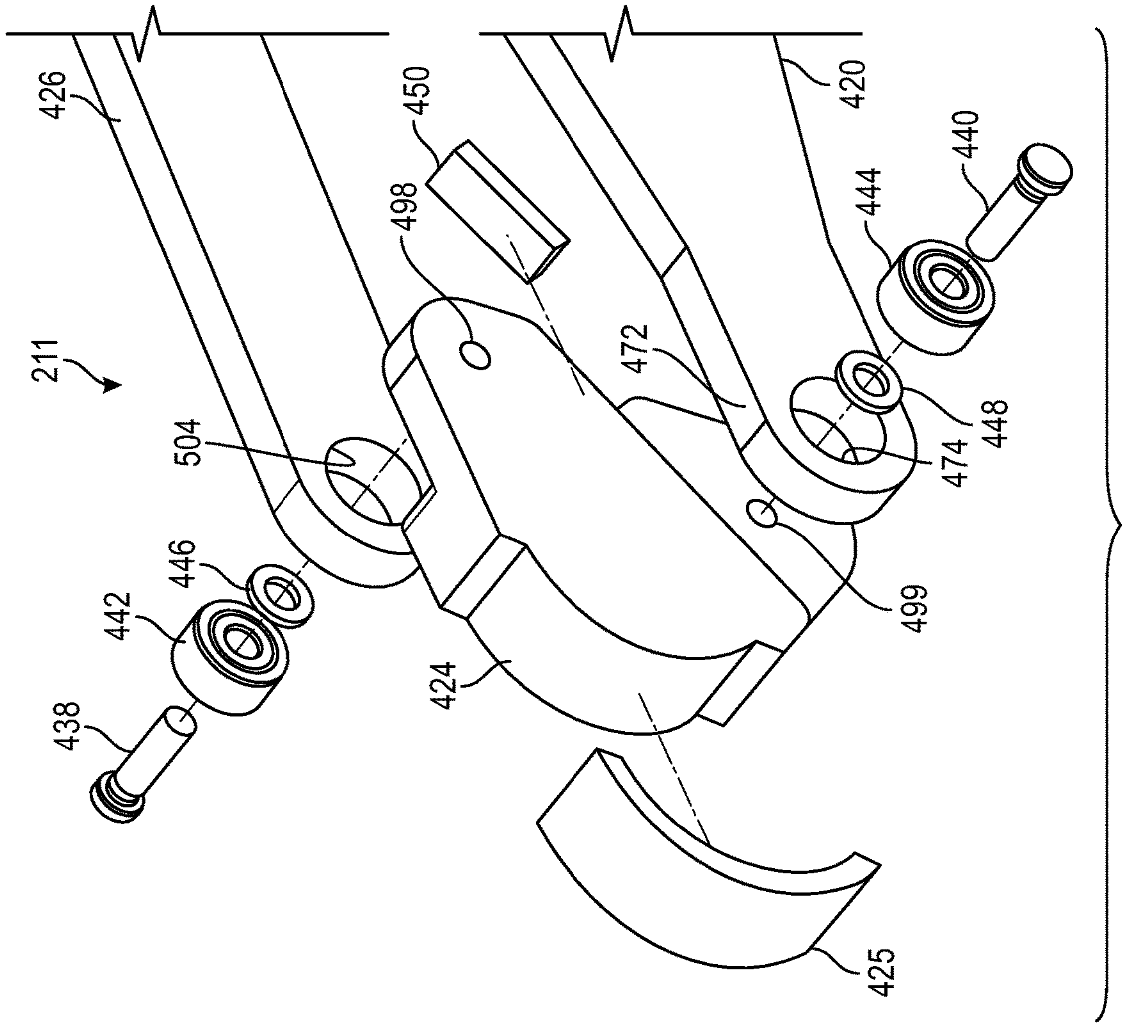
FIG. 22 is another partially exploded view of a portion of the cam assembly of FIG. 16.

Referring to FIGS. 16-26, the cam assembly 311 is provided to fret the string 61. Referring to FIGS. 19, 21 and 22, the cam assembly 311 includes a hinge plate 420, a mounting member 422, a cam 424, a pad 425, a cam link 426, a drive arm 428, a hinge shim 429, a spring 430, a drive arm guide 432, a drive arm guide rail 434, bolts 435, 436, 437, pins 438, 440, 441 (shown in FIGS. 21 and 22), bearings 442, 444, 445, washers 446, 448, 449, a pad 450, and bolts 460, 462 (shown in FIG. 21).

Figure 24:
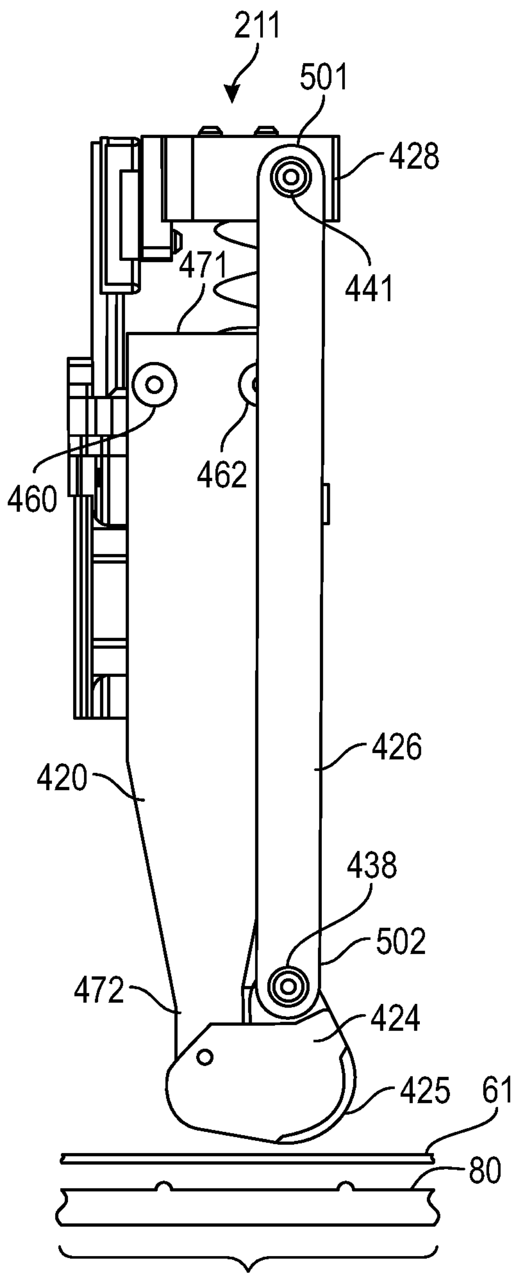
FIG. 24 is a second side view of the carriage member, the cam assembly, and the fretboard of FIG. 23 when the cam assembly has a non-fretting operational position.

Referring to FIGS. 19, 22 and 24, the hinge plate 420 is coupled to both the cam 424 and the mounting member 422. The hinge plate 420 extends perpendicular to the mounting member 422. The hinge plate 420 includes a first end portion 471 (shown in FIG. 24) and a second end portion 472. The second end portion 472 has an aperture 474 (shown in FIG. 22) extending therethrough. In an exemplary embodiment, the hinge plate 420 is constructed of metal.

Referring to FIG. 19, the mounting member 422 includes a body portion 480 and extension tab 481. The body portion 480 includes a first end portion 491 and a second end portion 492. The body portion 480 further includes apertures 484, 485, 486 and a groove 488 extending therethrough that are proximate to the first end portion 491. The extension tab 482 is coupled to and extends upwardly from the body portion 480 proximate to the first end portion 491 thereof. The second end portion 492 of the mounting member 422 is coupled to the first end portion 471 (shown in FIG. 21) of the hinge plate 420.

Referring to FIG. 21, the body portion 480 of the mounting member 422 further includes apertures 481, 482 extending into the second end portion 492 thereof, that communicate with first and second slots, respectively, that receive nuts 466, 468, respectively therein. The bolt 460 extends through the first end portion 471 of the hinge plate 420 and the aperture 481 of the mounting member 422 and into the nut 466—to couple the hinge plate 420 to the mounting member 422. Further, the bolt 462 extends through the first end portion 471 of the hinge plate 420 and the aperture 482 of the mounting member 422 and into the nut 468—to couple the hinge plate 420 to the mounting member 422. In an exemplary embodiment, the mounting member 422 is constructed of plastic. In an alternative embodiment, the mounting member 422 is constructed of metal.

Referring to FIGS. 19 and 22, the cam 424 is rotatably coupled to and between the hinge plate 420 and the cam link 426. The cam 424 includes apertures 498, 499 extending therethrough. The pad 425 is coupled to the cam 424 and is utilized to contact the string 61. In an exemplary embodiment, the pad 425 is constructed of leather. The hinge plate 420 is rotatably coupled to the cam 424 utilizing the pin 440, the bearing 444, and the washer 448. In particular, the washer 448 is disposed against the cam 424 proximate to the aperture 499 thereof. The bearing 444 is received within the aperture 474 of the hinge plate 420. The pin 440 extends through the bearing 444, the washer 448, and into the aperture 499 of the cam 424. The pad 450 is also coupled to the cam 424. The pad 450 serves as an endstop when the cam 424 returns to the second operational position. The pad 450 is provided to limit/reduce mechanical noise when the spring 430 returns the drive arm 428 upwardly away from the string 61. The pad 450 may be constructed of either rubber or leather. In an exemplary embodiment, the cam 424 is constructed of plastic. In an alternative embodiment, the cam 424 is constructed of metal.

Referring to FIGS. 21-24, the cam link 426 is utilized to rotate the cam 424 relative to the hinge plate 420. The cam link 426 includes a first end portion 501 and a second end portion 502. The first end portion 501 has an aperture 503 extending therethrough. The second end portion 502 has an aperture 504 extending therethrough. The first end portion 501 of the cam link 426 is coupled to the drive arm 428 utilizing the pin 441, the bearing 445 and the washer 449. In particular, referring to FIG. 21, the washer 449 is disposed against the drive arm 428 proximate to an aperture 515 thereof, and the bearing 445 is disposed in the aperture 503 of the cam link 426, and the pin 441 extends through the bearing 445, the washer 449, and into the aperture 515 of the drive arm 428—to couple the cam link 426 to the drive arm 428. The second end portion 502 of the cam link 426 is rotatably coupled to the cam 424 utilizing the pin 438, the bearing 442, and the washer 446. In particular, the washer 446 is disposed against the cam 424 proximate to the aperture 498 thereof. The bearing 442 is received within the aperture 504 of the cam link 426. The pin 438 extends through the bearing 442, the washer 446, and into the aperture 498 of the cam 424. In an exemplary embodiment, the cam link 426 is constructed of metal.

Referring to FIG. 19, the drive arm 428 is provided to move the cam link 426 upwardly and downwardly to rotate the cam 424 that is rotatably coupled to the cam link 426. The drive arm 428 includes a first end portion 511 and a second end portion 512. The first end portion 511 has an aperture 514 extending therethrough, and the second end portion 512 has an aperture 515 (shown in FIG. 21) extending therein. The first end portion 511 is coupled to the drive arm guide 432. The second end portion 512 of the drive arm 428 is coupled to the first end portion 501 of the cam link 426. The drive arm 428 is disposed above the mounting member 422. In an exemplary embodiment, the drive arm 428 is constructed of plastic. In an alternative embodiment, the drive arm 428 is constructed of metal.

Figure 23:
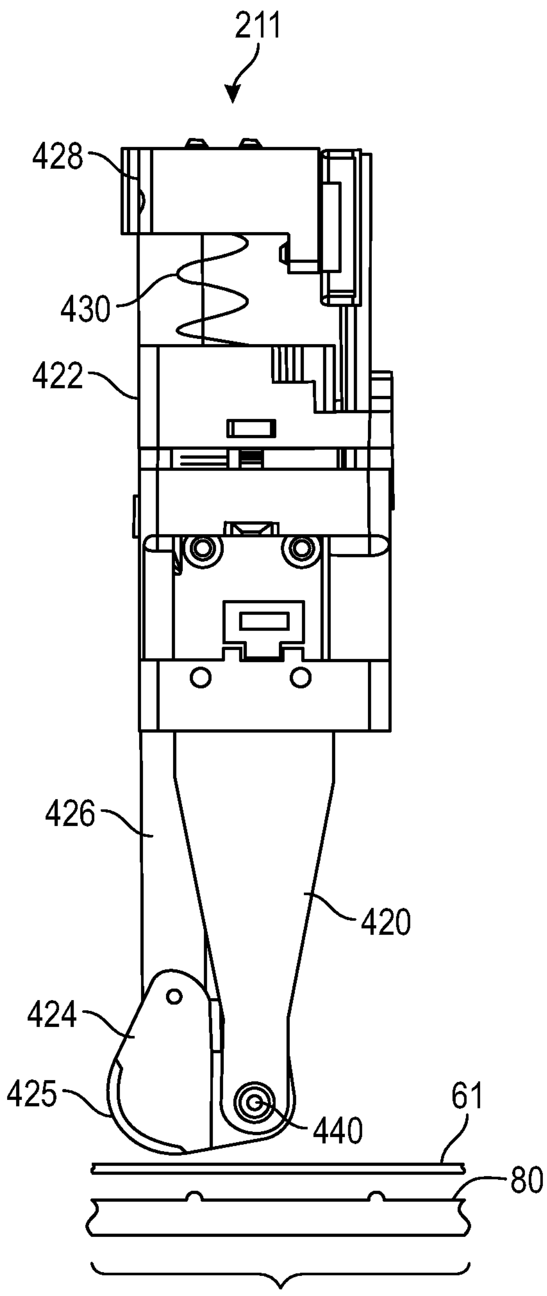
FIG. 23 is a first side view of the carriage member, the cam assembly, and the fretboard of FIG. 16 when the cam assembly has a non-fretting operational position.

Referring to FIGS. 19 and 23, the spring 430 is disposed between and coupled to the drive arm 428 and the mounting member 422 to bias the drive arm 428 upwardly relative to the mounting member 422. In particular, the spring 430 is disposed in a portion of the aperture 514 of the drive arm 428 and a portion of the aperture 484 of the mounting member 422.

Referring to FIG. 19, the hinge shim 429 is coupled to and between the first end portion 491 of the mounting member 422 and the carriage member 291. The hinge shim 429 is utilized to calibrate the distance between the cam 424 and the string 61. The thickness of the hinge shim 429 can be adjusted to a desired thickness since stringed instruments can have different actions (i.e., actions=distance from string to fretboard). The hinge shim 429 includes apertures 521, 522, 523 extending therethrough. The aperture 521 is aligned with the aperture 484 in the mounting member 422 such that the apertures 521, 484 receive the push-to-connect fitting 371 therein. The aperture 522 is aligned with the aperture 485 of the mounting member 422 such that a bolt 436 extends through a portion of the carriage member 291 and through the aperture 522 and into the aperture 584 to couple the hinge shim 429 and the mounting member 422 to the carriage member 291. Each of the bolts 435, 437 also extend through respective apertures in the mounting member 422, the hinge shim 429, and the carriage member 291 to couple the mounting member 422 to the carriage member 291. In an exemplary embodiment, the hinge shim 429 is constructed of plastic. In an alternative embodiment, the hinge shim 429 is constructed of metal.

The drive arm guide rail 434 is disposed vertically through the aperture 486 in the mounting member 422, and through the aperture 523 in the hinge shim 429 and into the carriage member 291—to couple the drive arm guide rail 434 to the mounting member 422 and the carriage member 291. The drive arm guide rail 434 extends upwardly from the mounting member 422. The drive arm guide 432 is slidably received on the drive arm guide rail 434 such that the drive arm guide 432 and the drive arm 428 moves upwardly and downwardly relative to the drive arm guide rail 434. In an exemplary embodiment, the drive arm guide rail 434 is constructed of metal.

Referring to FIGS. 8, 10, 14 and 20, the fretting solenoid 321 is provided to control operation of the cam assembly 311 for fretting the string 61. The fretting solenoid 321 is coupled to the mounting bracket 381 which is further coupled to the third frame member 163. The fretting solenoid 321 has a housing 560 and a piston 562 operably coupled thereto. The fretting solenoid 321 does not have an endstop to stop the piston 562. The piston 562 is coupled to the piston bracket 331. The piston bracket 331 is further coupled to the cable 341.

Figure 14:
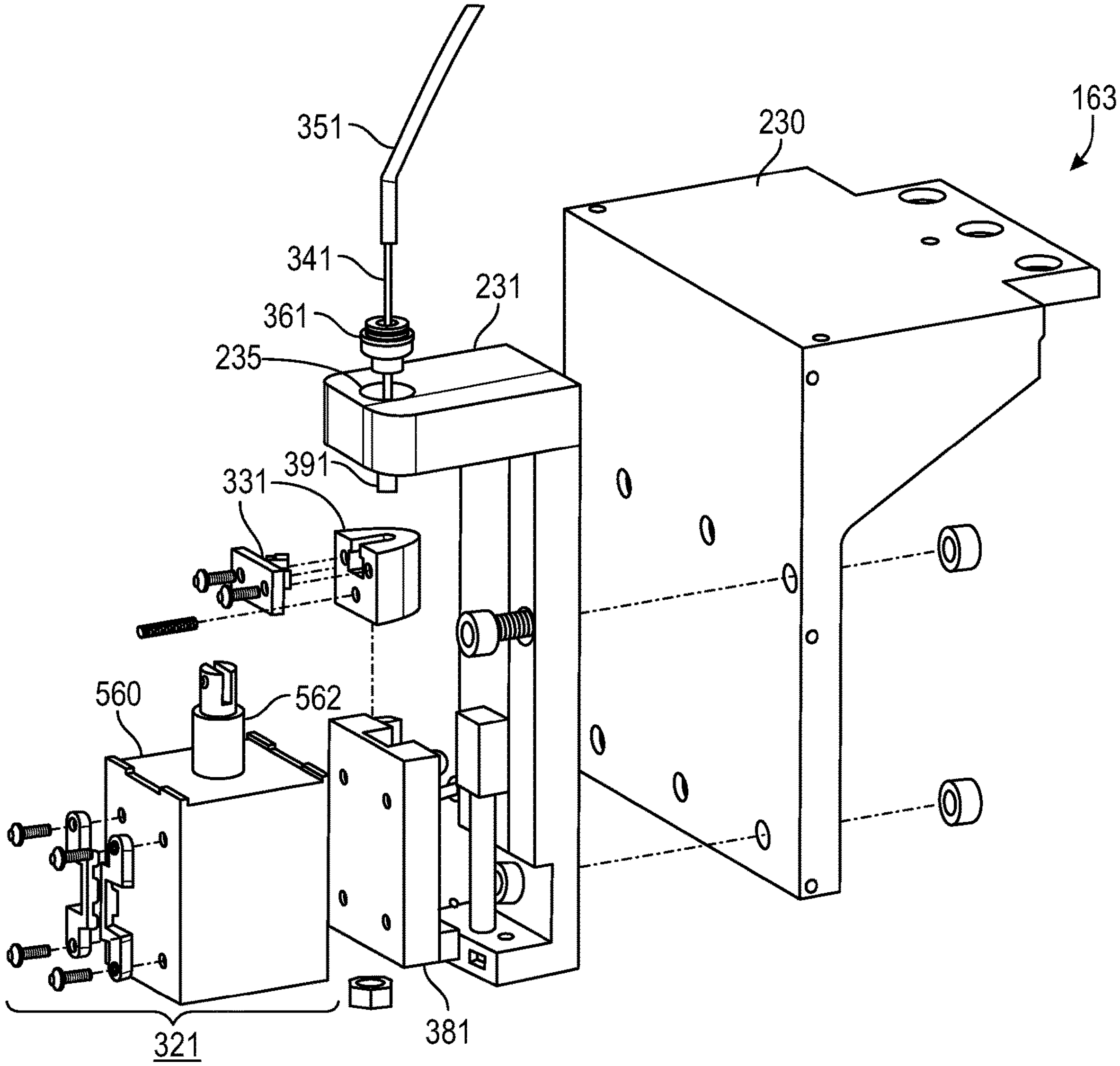
FIG. 14 is another partially exploded view of a portion of the first fretting subsystem of FIG. 1.
Figure 15:
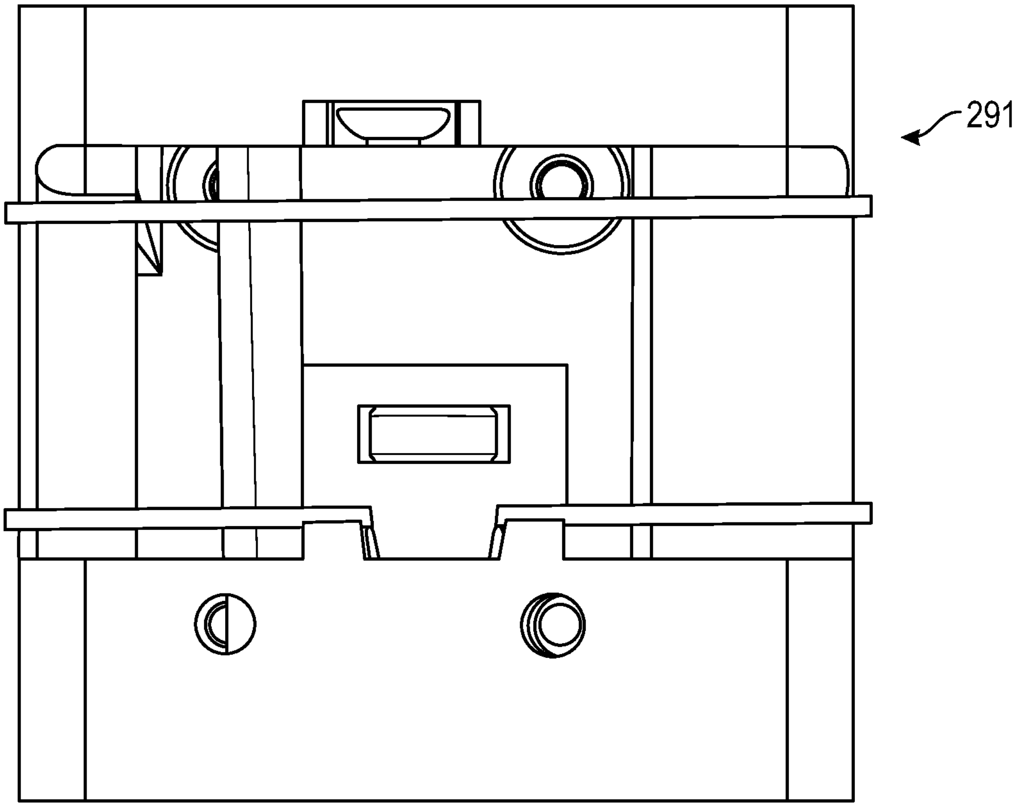
FIG. 15 is a side view of a carriage member utilized in a first fretting assembly in the first fretting subsystem of FIG. 10.
Figure 16:
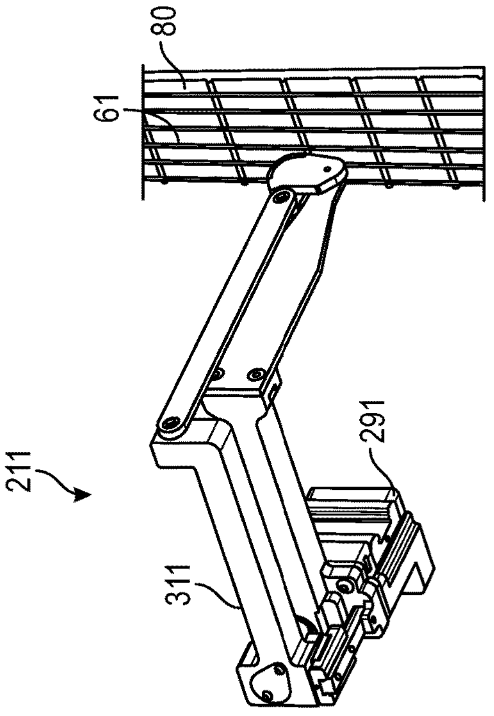
FIG. 16 is an isometric view of a carriage member and a cam assembly utilized in a first fretting assembly in the first fretting subassembly of FIG. 10 that is disposed above a fretboard.
Figure 17:
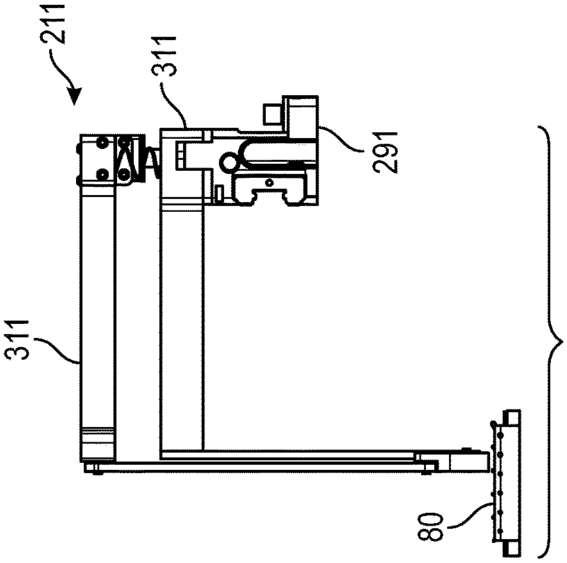
FIG. 17 is a front view of the carriage member, the cam assembly, and the fretboard of FIG. 16.
Figure 18:
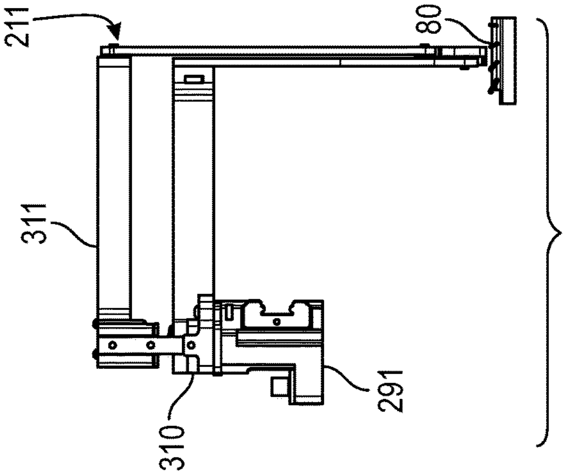
FIG. 18 is a rear view of the carriage member, the cam assembly, and the fretboard of FIG. 16.

Referring to FIGS. 14 and 20, a first end portion of the cable 341 is coupled to a cable tie 391 that is further coupled to the piston bracket 331. The cable 341 extends through a portion of the side bracket 231, the push-to-connect fitting 361, the Bowden tube 351, the push-to-connect fitting 371, the mounting member 422, the hinge shim 429, the spring 430, and the drive arm 428. A second end portion of the cable 341 is coupled to a cable tie 401 that is disposed against the drive arm 428.

Referring to FIG. 14, the push-to-connect fitting 361 is disposed in an aperture 235 of the side bracket 231. The first end portion of the Bowden tube 351 is coupled to the push-to-connect fitting 361.

Referring to FIGS. 19 and 20, the push-to-connect fitting 371 is disposed in an aperture 484 of the mounting member 422. The second end portion of the Bowden tube 351 is coupled to the push-to-connect fitting 371.

Referring to FIG. 14, the mounting bracket 381 is coupled to and between the fretting solenoid 321 and the side bracket 231. In an exemplary embodiment, the mounting bracket 381 is constructed of plastic. In an alternative embodiment, the mounting bracket 381 is constructed of metal.

Figure 25:
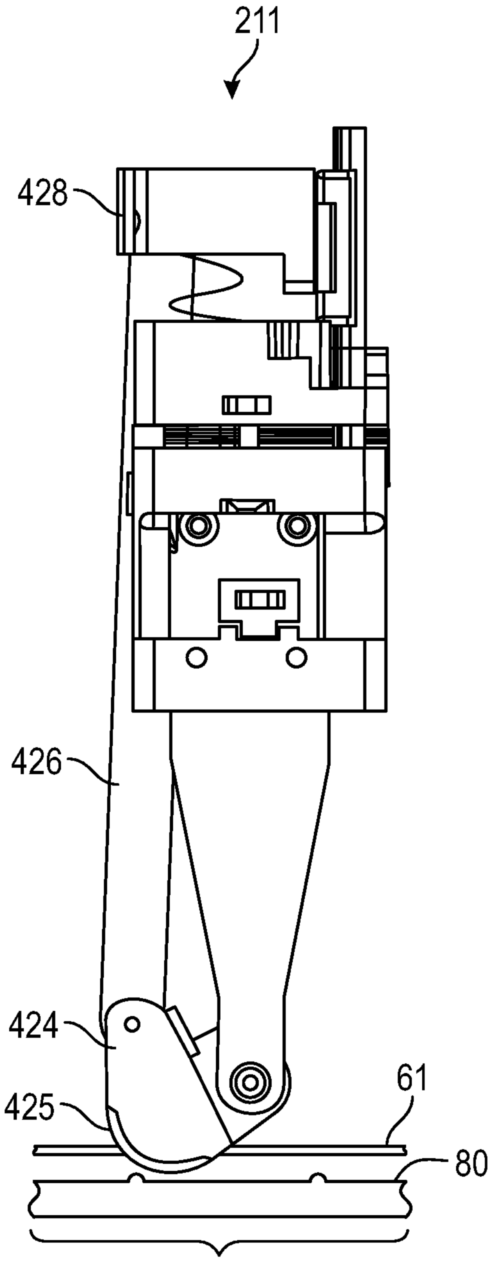
FIG. 25 is a first side view of the carriage member, the cam assembly, and the fretboard of FIG. 16 when the cam assembly has a fretting operational position.
Figure 26:
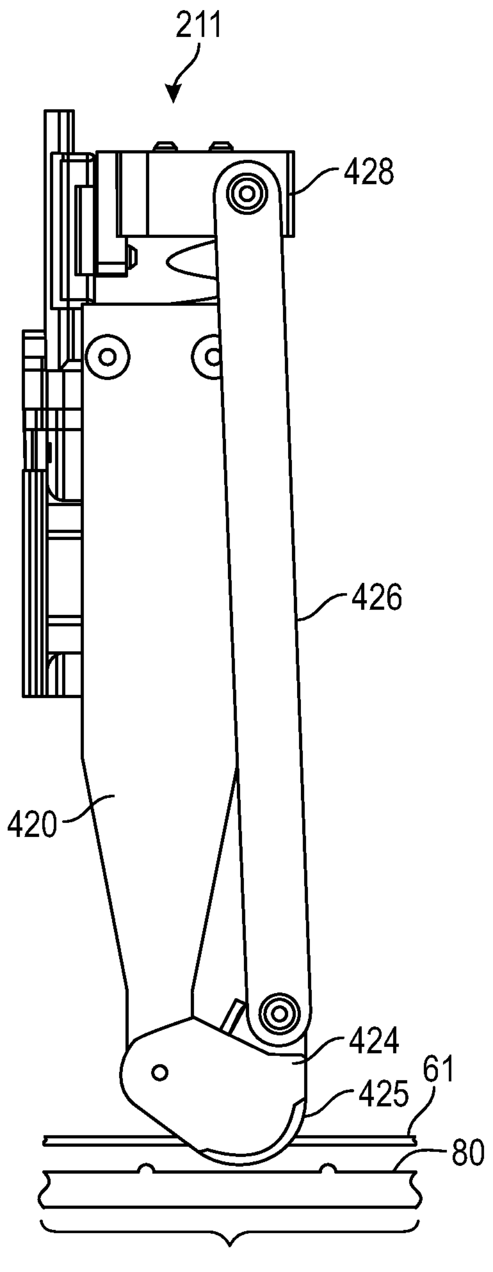
FIG. 26 is a second side view of the carriage member, the cam assembly, and the fretboard of FIG. 25 when the cam assembly has a fretting operational position.
Figure 27:
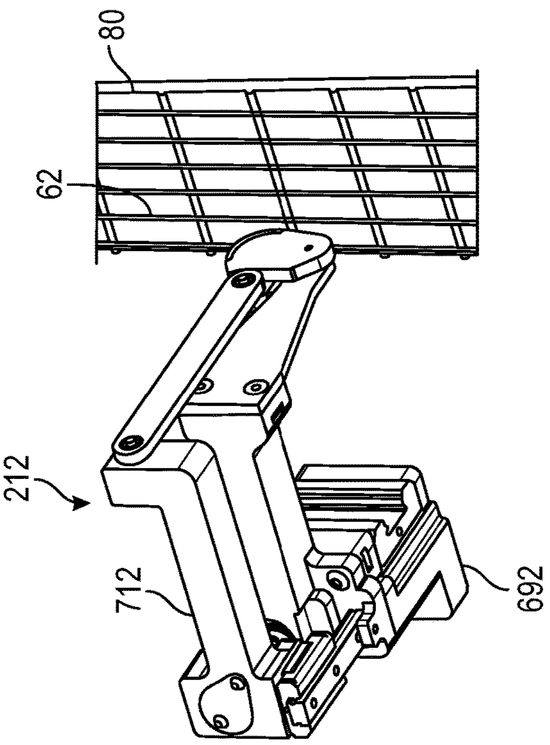
FIG. 27 is an isometric view of a carriage member and a cam assembly utilized in a second fretting assembly in the first fretting subassembly of FIG. 1 that is disposed above a fretboard.
Figure 28:
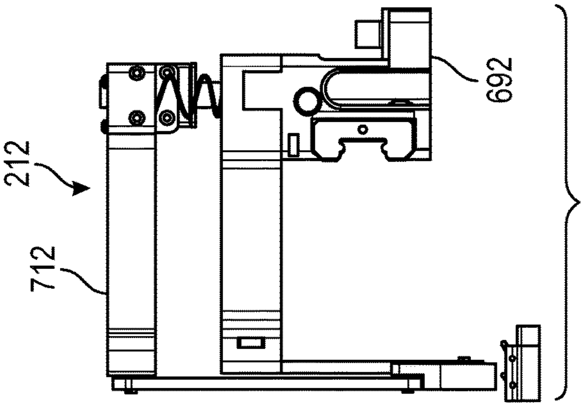
FIG. 28 is a front view of the carriage member, the cam assembly, and the fretboard of FIG. 27.
Figure 29:
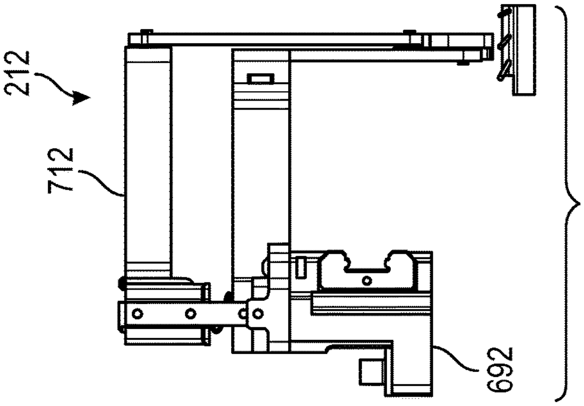
FIG. 29 is a rear view of the carriage member, the cam assembly, and the fretboard of FIG. 27.
Figure 30:
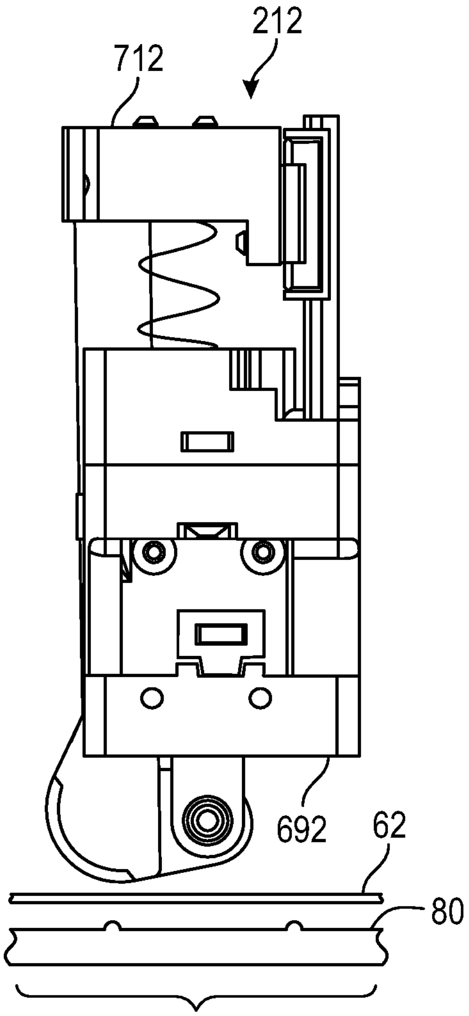
FIG. 30 is a first side view of the carriage member, the cam assembly, and the fretboard of FIG. 27 when the cam assembly has a non-fretting operational position.
Figure 31:
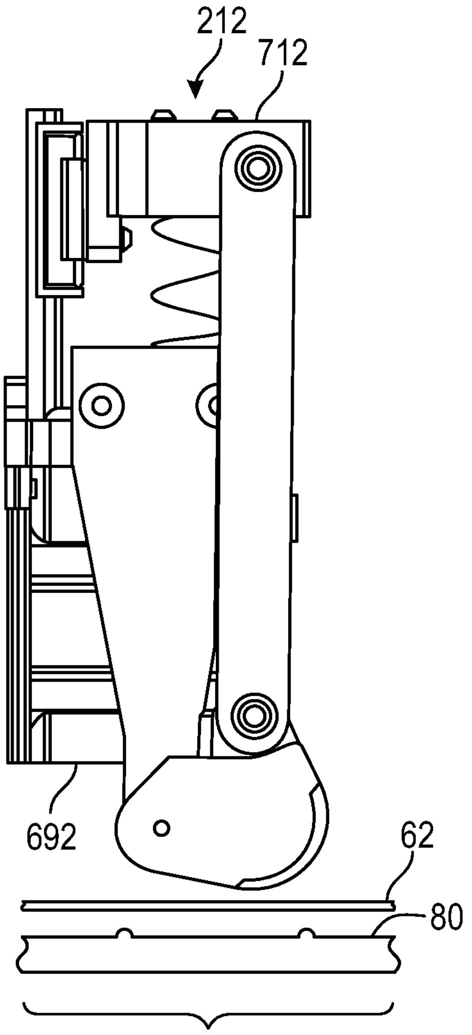
FIG. 31 is a second side view of the carriage member, the cam assembly, and the fretboard of FIG. 27 when the cam assembly has a non-fretting operational position.
Figure 32:
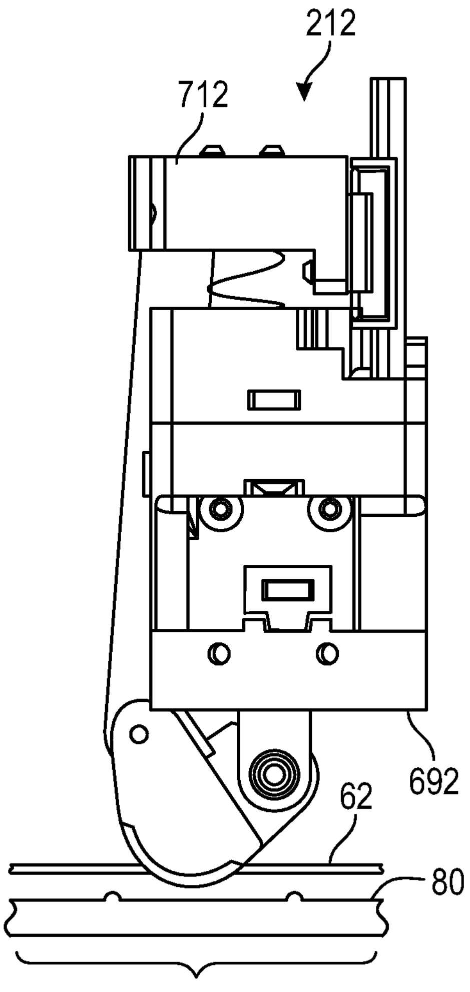
FIG. 32 is a first side view of the carriage member, the cam assembly, and the fretboard of FIG. 27 when the cam assembly has a fretting operational position.
Figure 33:
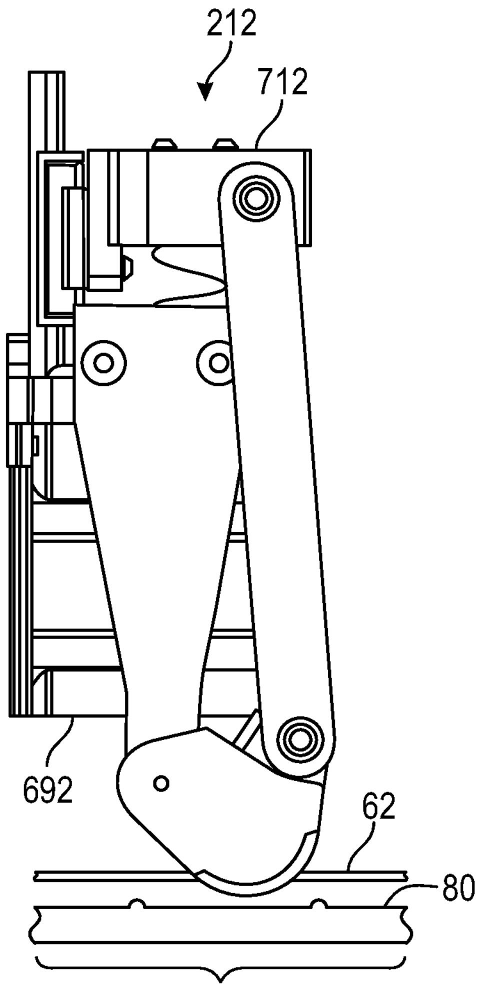
FIG. 33 is a second side view of the carriage member, the cam assembly, and the fretboard of FIG. 27 when the cam assembly has a fretting operational position.
Figure 34:
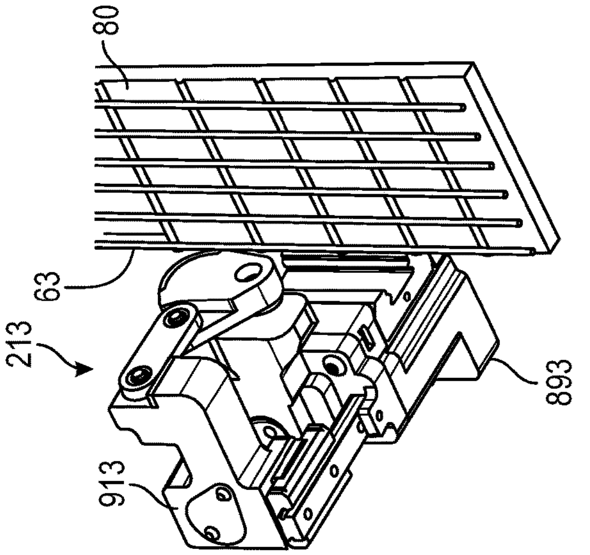
FIG. 34 is an isometric view of a carriage member and a cam assembly utilized in a third fretting assembly in the first fretting subassembly of FIG. 1 that is disposed above a fretboard.
Figure 35:
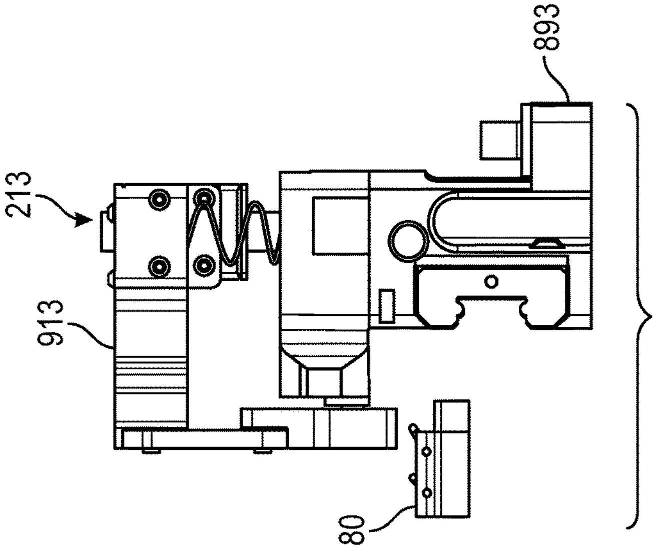
FIG. 35 is a front view of the carriage member, the cam assembly, and the fretboard of FIG. 34.
Figure 36:
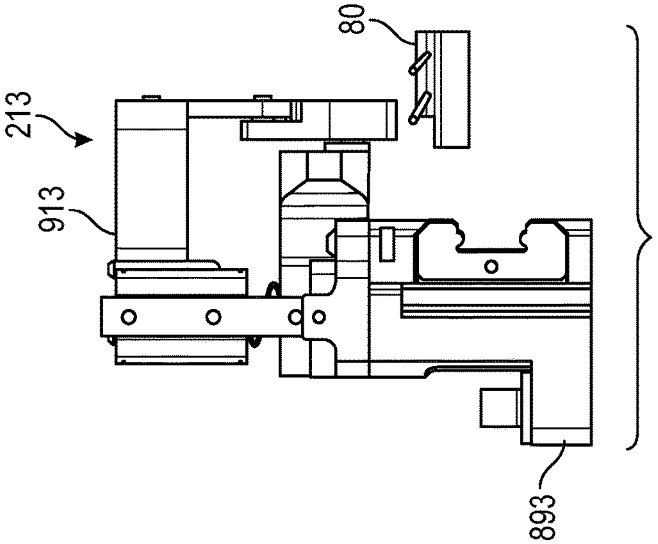
FIG. 36 is a rear view of the carriage member, the cam assembly, and the fretboard of FIG. 34.
Figure 37:
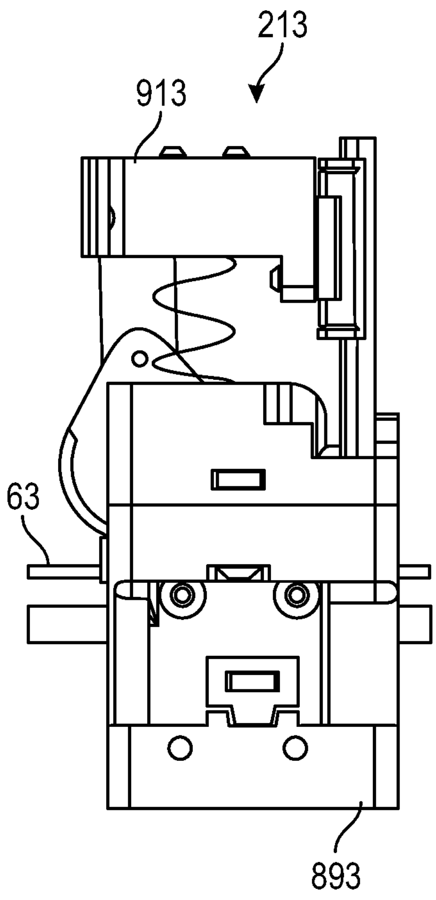
FIG. 37 is a first side view of the carriage member, the cam assembly, and the fretboard of FIG. 34 when the cam assembly has a non-fretting operational position.
Figure 38:
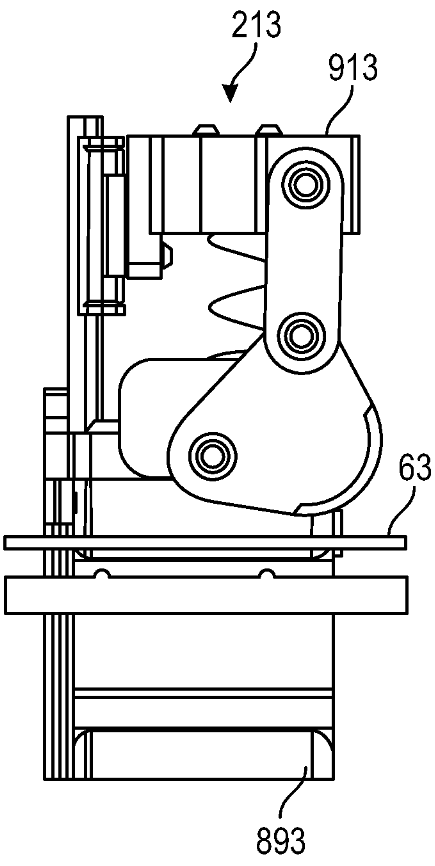
FIG. 38 is a second side view of the carriage member, the cam assembly, and the fretboard of FIG. 34 when the cam assembly has a non-fretting operational position.
Figure 39:
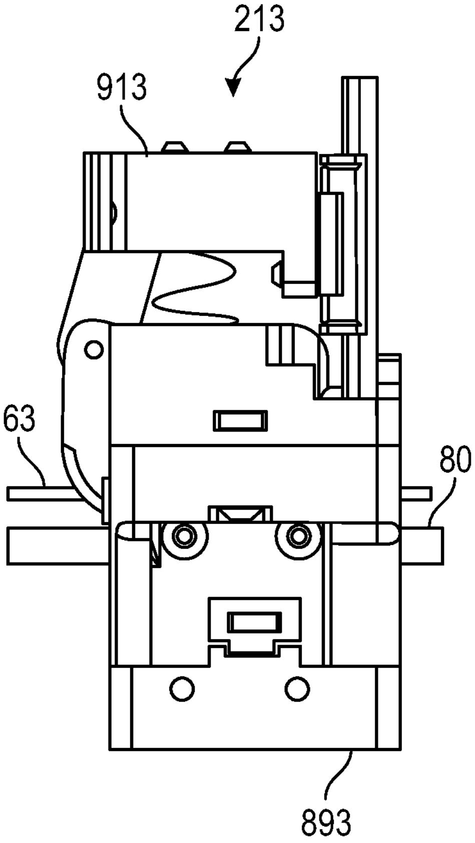
FIG. 39 is a first side view of the carriage member, the cam assembly, and the fretboard of FIG. 34 when the cam assembly has a fretting operational position.
Figure 40:
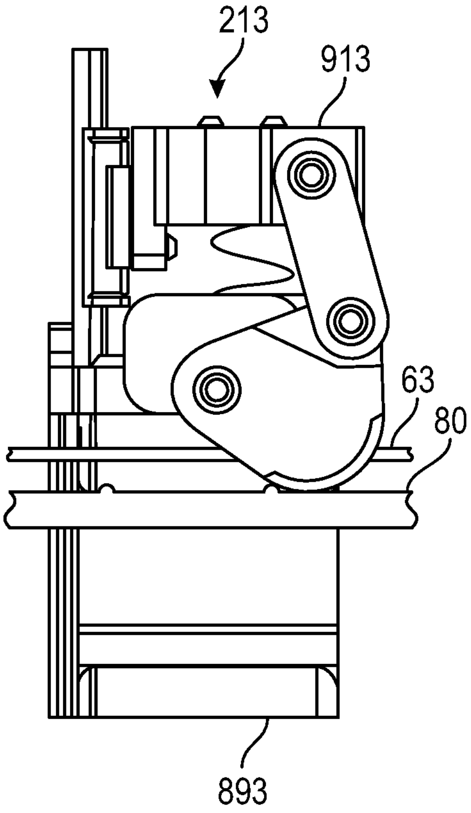
FIG. 40 is a second side view of the carriage member, the cam assembly, and the fretboard of FIG. 34 when the cam assembly has a fretting operational position.

Referring to FIGS. 4, 10, 14, 19 and 20, during operation, the fretting solenoid 321 is energized to move the piston 562 to a first operational position which induces the cable 341 to move drive arm 428 of the cam assembly 311 downwardly to a first vertical position such that the cam 424 rotates in a first rotational direction and the pad 425 contacts the string 61 (as shown in FIGS. 25 and 26) to fret the string 61. The fretting solenoid 321 is energized in response to a control signal from the user interface device 104 via the PCB 108. Further, the fretting solenoid 321 is de-energized which induces the spring 430 to move the drive arm 428 of the cam assembly 311 upwardly to a second vertical position such that the cam 424 rotates in a second rotational direction and the pad 425 stops contacting the string 61 (as shown in FIGS. 23 and 24). The fretting solenoid 321 is de-energized in response to the control signal not being generated by the user interface device 104 via the PCB 108.

Second Fretting Assembly

Referring to FIGS. 10 and 27-33, the second fretting assembly 212 is provided to fret the string 62 in a similar manner as the first fretting assembly 211 frets the string 61 as described above. Further, the second fretting assembly 212 has a substantially similar structure and components as the first fretting assembly 211 except that the assembly 212 has a cam assembly 712 with some components having smaller sizes than the components of the cam assembly 311. In particular, the second fretting assembly 212 includes a carriage member 692, a cam assembly 712, a fretting solenoid 722 (shown in FIG. 10), a piston bracket 732, a cable 742, a Bowden tube 752, a push-to-connect fitting (not shown), a push-to-connect fitting (not shown), a mounting bracket (not shown), first and second cable ties (not shown). The operation of the second fretting assembly 212 is substantially similar to the operation of the first fretting assembly 211.

Third Fretting Assembly

Referring to FIGS. 10 and 34-40, the third fretting assembly 213 is provided to fret the string 63 in a similar manner as the first fretting assembly 211 frets the string 61 as described above. Further, the third fretting assembly 213 has a substantially similar structure and components as the first fretting assembly 211 except that the assembly 213 has a cam assembly 913 with some components having smaller sizes than the components of the cam assembly 311 and the components of the cam assembly 712. Also, the cam assembly 913 of the third fretting assembly 213 does not utilize a hinge plate since the hinge plate functionality is built into the mounting member thereof since the third fretting assembly 213 is located relatively close the string 63. In particular, the third fretting assembly 213 includes a carriage member 893, a cam assembly 913, a fretting solenoid 923 (shown in FIG. 10), a piston bracket 933, a cable 943, a Bowden tube 953, a push-to-connect fitting (not shown), a push-to-connect fitting (not shown), a mounting bracket (not shown), first and second cable ties (not shown). The operation of the third fretting assembly 212 is substantially similar to the operation of the first fretting assembly 211.

Fretting Subsystem

Referring to FIGS. 1 and 2, the fretting subsystem 132 is disposed opposite to the fretting subsystem 131 and is removably coupled to the neck 52 of the stringed instrument 20. In particular, the coupling rods 141, 142 are coupled to and extend between upper portions of the fretting subsystems 131, 132 to removably couple the fretting subsystems 131, 132 to the neck 52 of the stringed instrument 20. Further, the coupling rods 143, 144 are coupled to and extend between lower portions of the fretting subsystems 131, 132 to removably couple the fretting subsystems 131, 132 to the neck 52 of the stringed instrument 20. The fretting subsystem 132 is provided to fret the strings 64, 65, 66 (shown in FIG. 8) on the stringed instrument 20. Further, the fretting subsystem 132 has substantially a mirrored structure compared to the fretting subsystem 131.

Picking System

Referring to FIGS. 1 and 41-46, the picking system 102 is removably coupled to the body 50 and is provided to pick the strings 61, 62, 63, 64, 65, 66 of the stringed instrument 20. The picking system 102 includes a picking subsystem 1001 and a picking subsystem 1002.

Picking Subsystem

Referring to FIGS. 41-46, the picking subsystem 1001 is provided to pick the strings 61, 62, 63 and is removably coupled to the body 50 of the stringed instrument 20. The picking subsystem 1001 includes mounting plates 1100, 1102, coupling rods 1110, 1112, picking solenoids 1121, 1122, 1124, 1125, 1128, 1129, and picks 1131, 1132, 1133.

The mounting plate 1100 is disposed on a front face of the body 50 of the stringed instrument 20, and the mounting plate 1102 is disposed on a rear face of the body 50 of the stringed instrument 20. The mounting plates 1100, 1102 are removably coupled to the body 50 utilizing the coupling rods 1110, 1112. In an exemplary embodiment, the mounting plates 1100, 1102 are constructed of plastic, and the coupling rods 1110, 1112 are constructed metal.

The picking solenoids 1121, 1122 are provided to pull in opposite directions to move a pick 1131 back and forth over the string 61. The picking solenoid 1121 is coupled to the mounting plate 1100 and includes a housing 1200 and a piston 1202 operably coupled thereto. The picking solenoid 1121 does not have an endstop to stop the piston 1202. The picking solenoid 1122 is coupled to the mounting plate 1100 and includes a housing 1204 and a piston 1206 operably coupled thereto. The picking solenoid 1122 does not have an endstop to stop the piston 1206. The piston 1206 is coupled to the piston 1202. Further, the piston 1206 is coupled to the pick 1131.

During operation, the picking solenoid 1121 is energized in response to the control signal from the user interface device 104 via the PCB 108 while the picking solenoid 1122 is de-energized to move the piston 1206 to a first operational position which induces the pick 1131 to move across and contact the string 61 of the string instrument 20 to obtain a musical sound. Afterward, the picking solenoid 1122 is energized in response to the control signal from the user interface device 104 via the PCB 108 while the picking solenoid 1121 is de-energized to move the piston 1206 to a second operational position which induces the pick 1131 to move across and contact the string 61 of the string instrument 20 to obtain a musical sound.

The picking solenoids 1124, 1125 are provided to pull in opposite directions to move a pick 1132 back and forth over the string 62. The picking solenoid 1124 is coupled to the mounting plate 1100 and includes a housing 1210 and a piston 1212 operably coupled thereto. The picking solenoid 1124 does not have an endstop to stop the piston 1212. The picking solenoid 1125 is coupled to the mounting plate 1100 and includes a housing 1214 and a piston 1216 operably coupled thereto. The picking solenoid 1125 does not have an endstop to stop the piston 1216. The piston 1216 is coupled to the piston 1212. Further, the piston 1216 is coupled to the pick 1132.

During operation, the picking solenoid 1124 is energized in response to the control signal from the user interface device 104 via the PCB 108 while the picking solenoid 1125 is de-energized to move the piston 1216 to a first operational position which induces the pick 1132 to move across and contact the string 62 of the string instrument 20 to obtain a musical sound. Afterward, the picking solenoid 1125 is energized in response to the control signal from the user interface device 104 via the PCB 108 while the picking solenoid 1124 is de-energized to move the piston 1216 to a second operational position which induces the pick 1132 to move across and contact the string 62 of the string instrument 20 to obtain a musical sound.

The picking solenoids 1128, 1129 are provided to pull in opposite directions to move a pick 1133 back and forth over the string 63. The picking solenoid 1128 is coupled to the mounting plate 1100 and includes a housing 1220 and a piston 1222 operably coupled thereto. The picking solenoid 1128 does not have an endstop to stop the piston 1222. The picking solenoid 1129 is coupled to the mounting plate 1100 and includes a housing 1224 and a piston 1226 operably coupled thereto. The picking solenoid 1129 does not have an endstop to stop the piston 1226. The piston 1226 is coupled to the piston 1222. Further, the piston 1226 is coupled to the pick 1133.

During operation, the picking solenoid 1128 is energized in response to the control signal from the user interface device 104 via the PCB 108 while the picking solenoid 1129 is de-energized to move the piston 1226 to a first operational position which induces the pick 1133 to move across and contact the string 63 of the string instrument 20 to obtain a musical sound. Afterward, the picking solenoid 1129 is energized in response to the control signal from the user interface device 104 via the PCB 108 while the picking solenoid 1128 is de-energized to move the piston 1226 to a second operational position which induces the pick 1133 to move across and contact the string 63 of the string instrument 20 to obtain a musical sound.

Picking Subsystem

Figure 42:
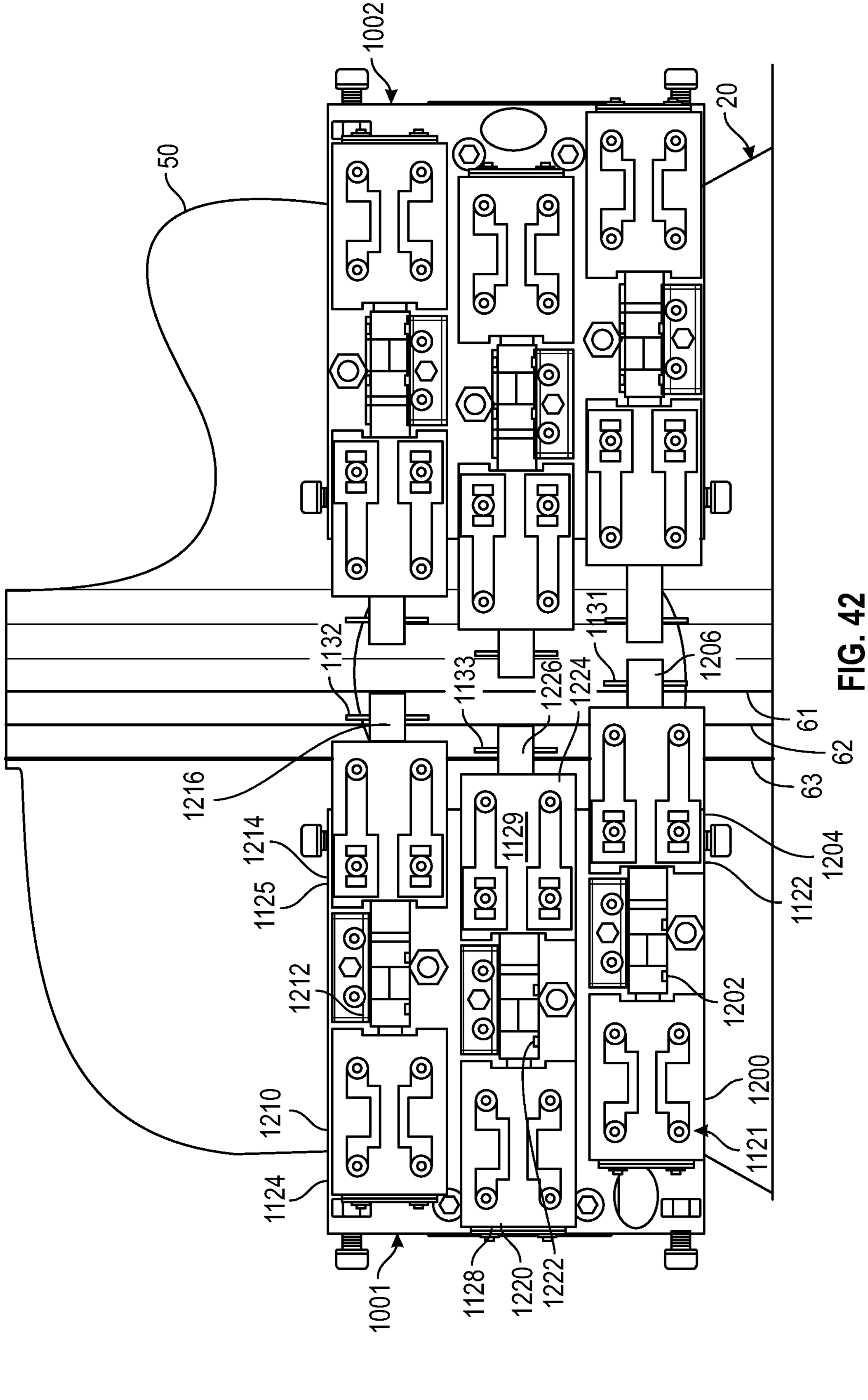
FIG. 42 is a top view of the stringed instrument and the picking system of FIG. 41.
Figure 43:
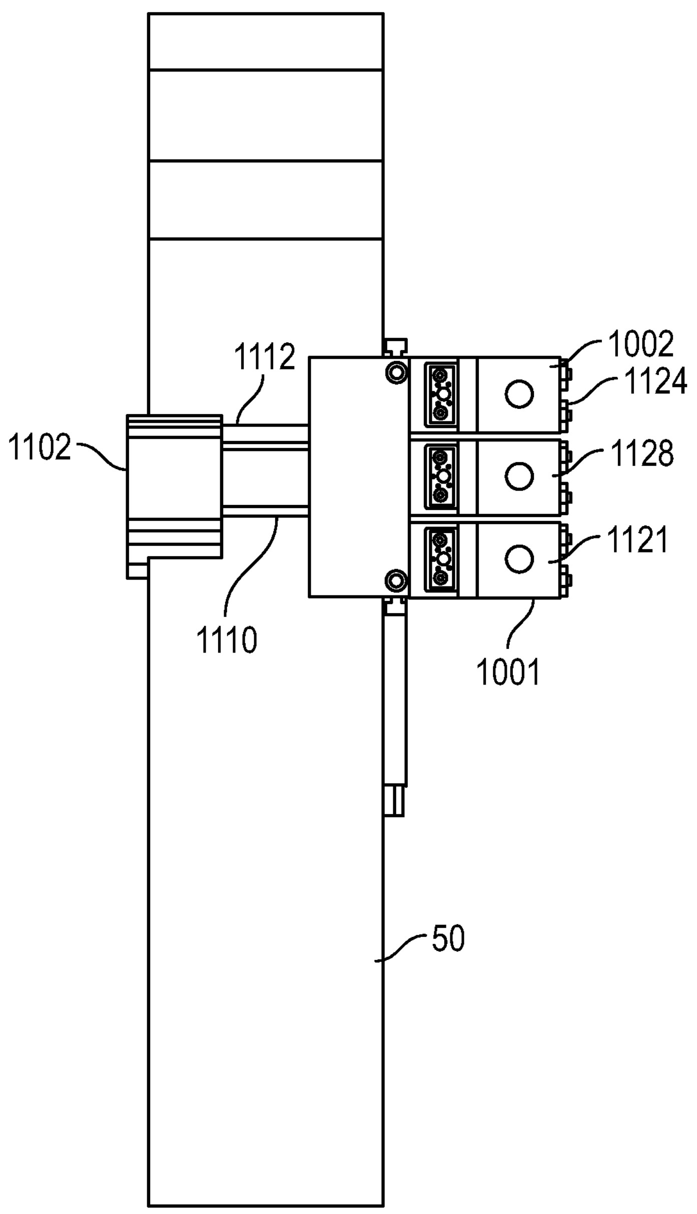
FIG. 43 is a first side view of the stringed instrument and the picking system of FIG. 41.
Figure 44:
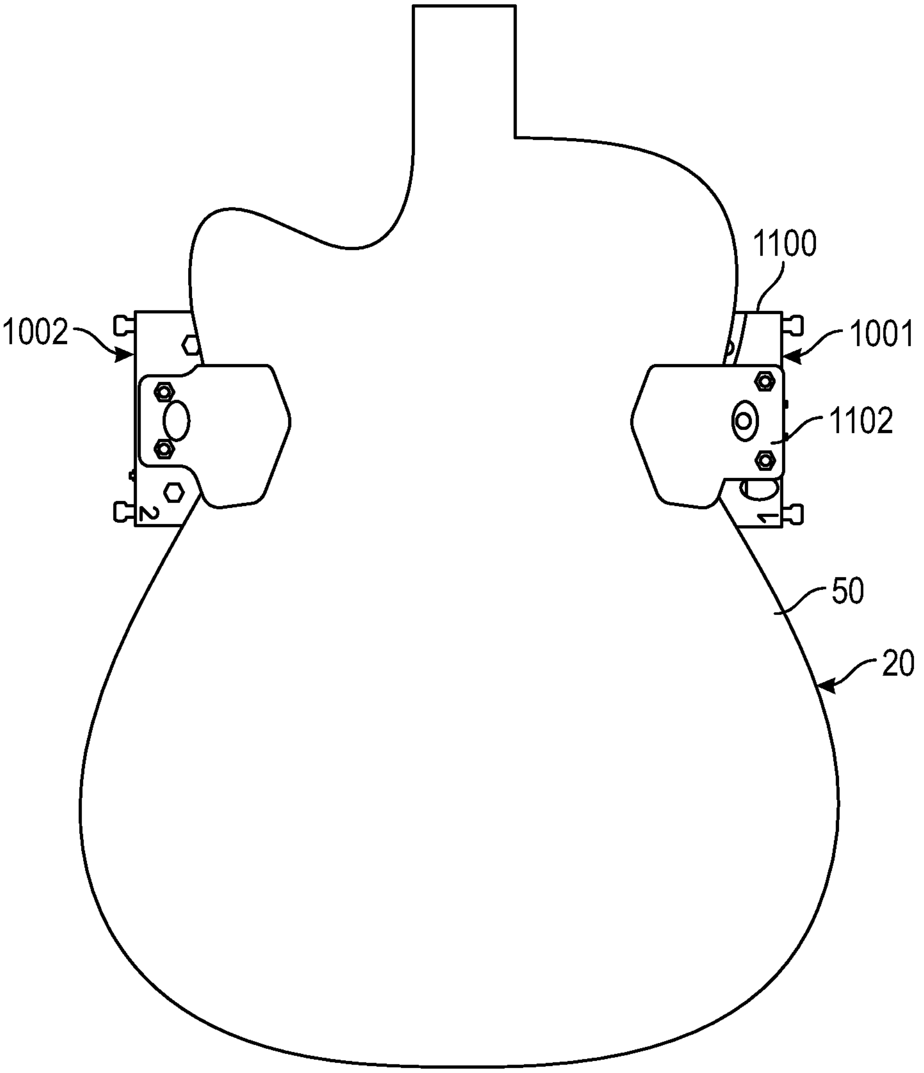
FIG. 44 is a rear view of the stringed instrument and the picking system of FIG. 41.
Figure 45:
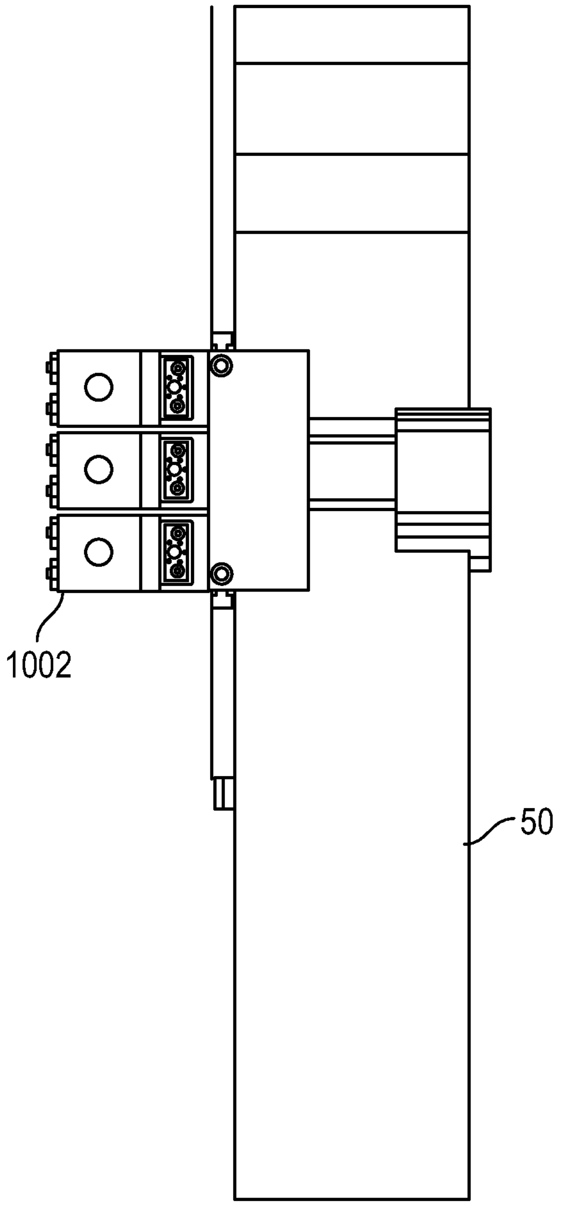
FIG. 45 is a second side view of the stringed instrument and the picking system of FIG. 41.

Referring to FIGS. 1 and 42, the picking subsystem 1002 is disposed opposite to the picking subsystem 1001 and is removably coupled to the body 50 of the stringed instrument 20. The picking subsystem 1002 is provided to pick the strings 64, 65, 66 on the stringed instrument 20. Further, the picking subsystem 1002 has substantially a mirrored structure compared to the picking subsystem 1001.

PCB

Referring to FIG. 4, the PCB 108 is electrically coupled to the user interface device 104, the fretting system 100, the picking system 102, and the power supply 106. The PCB 108 routes control signals from the user interface device 104 to the fretting system 100 and the picking system 102. Further, the PCB 108 routes operational voltages from the power supply 106 to the fretting system 100 and the picking system 102.

User Interface Device

Referring to FIGS. 1-5, the user interface device 104 is provided to control operation of the fretting system 100 and the picking system 102 to play audible music utilizing the stringed instrument 20. The user interface device 104 includes a microprocessor 1300 (shown in FIG. 4) operably coupled to a touchscreen 1302 and a memory device 1304. The memory device 1304 stores software instructions and music data that are utilized by the microprocessor 1300 to generate control signals for controlling the fretting system 100 and the picking system 102. The music data includes data corresponding to a plurality of selected songs. In particular, the microprocessor 1300 generates control signals that are routed through the PCB 108 to the fretting system 100 and the picking system 102 to control components therein for generating audible music corresponding to the selected songs.

Figure 6:
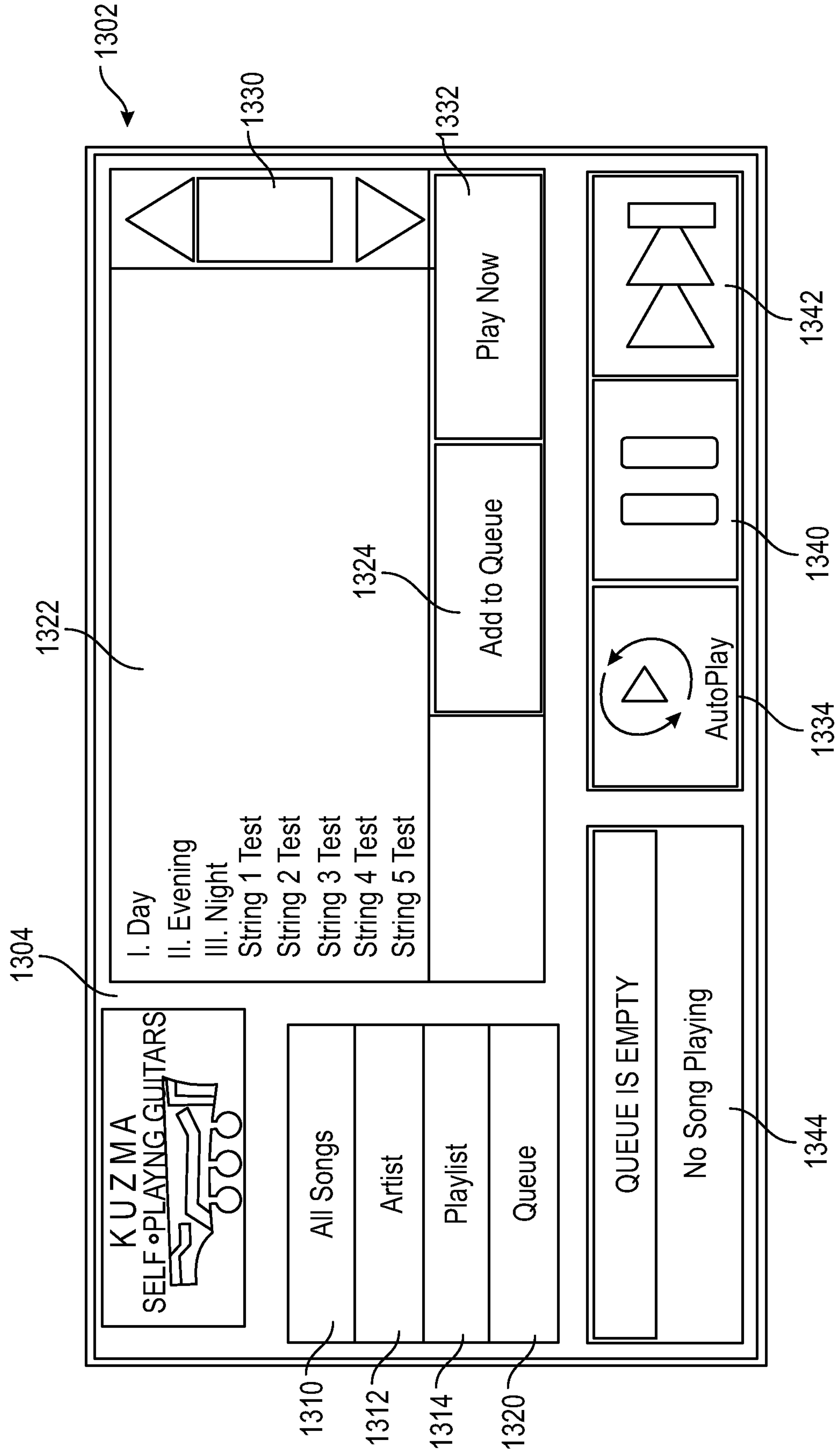
FIG. 6 is a schematic of a user interface device utilized in the automated string playing system of FIG. 1.
Figure 7:
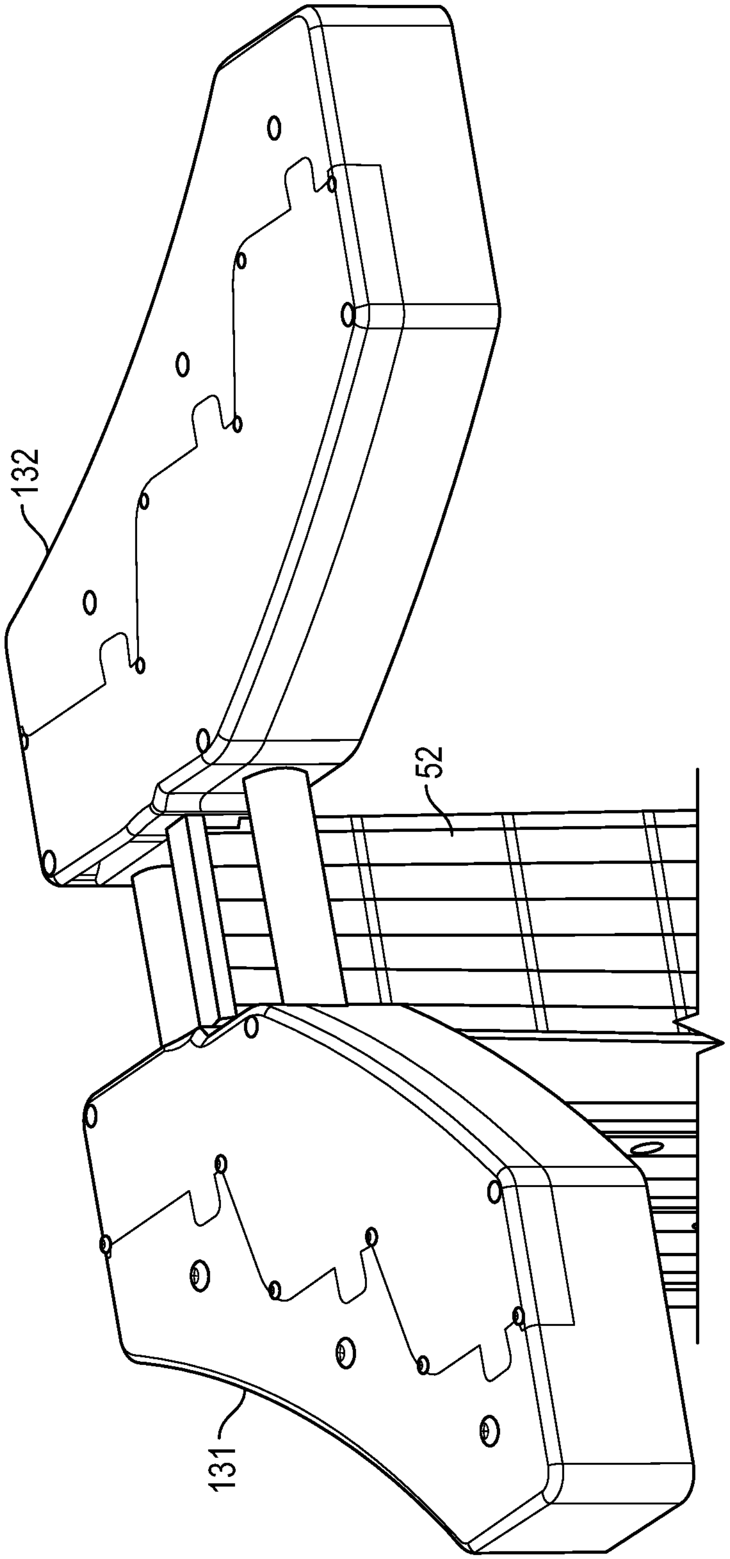
FIG. 7 is a schematic of a portion of first and second fretting subsystems utilized in the automated string playing system of FIG. 1.

Referring to FIG. 6, the touch-screen 1302 includes a graphical user interface (GUI) 1304 that allows a user to select songs and to control operation of the automated string playing system 40 in playing the songs. The GUI 1304 includes an all songs command selection button 1310, an artist selection button 1312, a playlist selection button 1314, a queue selection button 1320, a song list section 1322, an add to queue command button 1324, a scroll bar 1330, a play now command button 1332, an autoplay command button 1334, a play/pause command button 1340, a skip command button 1342, and a message section 1344.

The all songs command selection button 1310 allows the user to view all of the songs stored in the memory device 1304 in the song list section 1322.

The artist selection button 1312 allows the user to view all songs associated with a particular song artist that are stored in the memory device 1304, in the song list section 1322.

The playlist selection button 1304 allows the user to view all playlists that are stored in the memory device 1304, in the song list section 1322.

The queue selection button 1320 allows the user to view all songs that are currently queued for playing, in the song list section 1322.

The add to queue command button 1324 allows the user to add specific songs to be played, wherein the specific songs are listed in the song list section 1322.

The scrollbar 1330 allows user to scroll through the songs displayed in the song list section 1322.

The play now command button 1322 allows the user to instruct the automated string playing system 40 to play the selected song in the song list section 1322.

The autoplay command button 1334 allows the user to instruct the automated string playing system 40 to cycle through song playlists and play the associated music on the stringed instrument 20.

The play/pause command button 1340 allows the user to instruct the automated string playing system 40 to stop playing the selected song on the stringed instrument 20.

The skip command button 1342 allows the user to instruct the automated string playing system 40 to clear the existing song or move to the next song in the queue.

The message section 1344 provides informational messages on the operation of the automated string playing system 40 to the user.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An automated string playing system for a stringed instrument, the stringed instrument having a body, a neck extending from the body, and a string tensioned between the body and a top portion of the neck, the neck having a fretboard attached thereto, comprising:

a fretting subsystem being removably coupled to the neck; the fretting subsystem having first and second frame members, a drive belt, a drive belt motor, a drive belt pulley, a longitudinal guide rail, and a first fretting assembly;

the drive belt pulley being coupled to the first frame member, the drive belt motor being coupled to the second frame member;

the drive belt being operably coupled to and between the drive belt motor and the drive belt pulley;

the first longitudinal guide rail being coupled to and between the first and second frame members;

the first fretting assembly having a carriage member and a cam assembly coupled thereto, the carriage member being slidably coupled to the longitudinal guide rail, and coupled to the drive belt; the drive belt motor moving the drive belt and the cam assembly to desired positions along the fretboard; the cam assembly having a cam and a pad coupled to the cam, the cam rotating in a first rotational direction such that the pad contacts the string to fret the string;

a picking subsystem being removably coupled to the body, the picking subsystem having a first picking solenoid that moves a pick across the string of the string instrument to obtain a musical sound; and a user interface device operably coupled to the fretting subsystem and the picking subsystem that enables user control of the fretting subsystem and the picking subsystem to play music.

2. The automated string playing system of claim 1, wherein:

the cam rotating in a second rotational direction such that the pad stops contacting the string to stop fretting the string.

3. The automated string playing system of claim 1, wherein:

the cam assembly having a hinge plate, a mounting member, the cam, a cam link, a drive arm, a spring, a drive arm guide, and a drive arm guide rail;

the carriage member being slidably coupled to the longitudinal guide rail, and coupled to the drive belt;

the mounting member being coupled to the carriage member;

the hinge plate being coupled to the mounting member and extending perpendicular to the mounting member;

the drive arm guide rail being coupled to the mounting member and extending upwardly therefrom;

the drive arm guide being slidably received on the drive arm guide rail and coupled to the drive arm; the drive arm being disposed above the mounting member;

the spring being coupled to and between the mounting member and the drive arm to bias the drive arm upwardly from the mounting member;

the cam link being coupled to the drive arm and extending perpendicular to the drive arm; and the cam being rotatably coupled to and between the cam link and the hinge plate.

4. The automated string playing system of claim 3, wherein:

the first fretting assembly further includes a cable and a fretting solenoid;

the cable being coupled to and between the drive arm and a piston of the fretting solenoid;

the fretting solenoid moving the piston to a first operational position which induces the cable to move the drive arm downwardly to a first vertical position to rotate the cam in the first rotational direction such that the pad contacts the string to fret the string; and the fretting solenoid moving the piston to a second operational position which induces the spring to move the drive arm upwardly to a second vertical position such that the cam rotates in the second rotational direction and the pad stops contacting the string.

5. The automated string playing system of claim 4, wherein:

the first fretting assembly further includes a Bowden tube, a push-to-connect fitting, and a cable tie;

the Bowden tube enclosing the cable, a first end portion of the Bowden tube being coupled to the fretting solenoid, a second end portion of the Bowden tube being coupled to the push-to-connect fitting;

the push-to-connect fitting being further coupled to the mounting member; and the cable extending through the carriage member, the mounting member, and the drive arm and further coupled to the cable tie, the cable tie engaging the drive arm.

6. The automated string playing system of claim 4, further comprising:

a third frame member coupled to the second frame member, the fretting solenoid being disposed on the third frame member.

7. The automated string playing system of claim 6, wherein:

the fretting solenoid does not have an endstop to stop the piston thereof.

8. The automated string playing system of claim 1, wherein:

the first picking solenoid being coupled to a mounting plate, the mounting plate is removably coupled to the body on the stringed instrument; the first picking solenoid having a first housing and a first piston disposed through the first housing, the first piston is coupled to the pick, such that when the first piston is moved outwardly the pick moves across the string of the stringed instrument to obtain the musical sound.

9. The automated string playing system of claim 8, further comprising:

a second picking solenoid being coupled to the mounting plate, the second picking solenoid having a second housing and a second piston disposed through the second housing, the second piston being coupled to the first piston, such that when the first picking solenoid is energized and the second picking solenoid is de-energized, the first piston is moved outwardly to move the pick across the string of the stringed instrument to obtain the musical sound.

10. The automated string playing system of claim 9, wherein:

when the second picking solenoid is energized and the first picking solenoid is de-energized, the first piston is moved inwardly to move the pick across the string of the stringed instrument to obtain the musical sound.

11. The automated string playing system of claim 9, wherein:

the first picking solenoid does not have an endstop to stop the first piston thereof; and the second picking solenoid does not have an endstop to stop the second piston thereof.

* * * * *